(12) United States Patent
Lee

(10) Patent No.: US 6,528,908 B1
(45) Date of Patent: Mar. 4, 2003

(54) INDUCTION DRIVE FOR INDUCTION DRIVEN CONVEYOR INCLUDING A VIRTUAL CONTINUOUS MAGNETIC BODY AND METHOD OF DRIVING INDUCTION DRIVEN CONVEYOR INCLUDING A VIRTUAL CONTINUOUS MAGNETIC BODY

(76) Inventor: Rick Lee, 1660 Harberson La., Danville, KY (US) 40422

( * ) Notice: Subject to any disclaimer, the term of this patent is extended or adjusted under 35 U.S.C. 154(b) by 0 days.

(21) Appl. No.: 09/973,271

(22) Filed: Oct. 9, 2001

(51) Int. Cl.[7] .................. B65G 35/02; B65G 15/06; B65G 15/30; H02K 41/00
(52) U.S. Cl. .................. 310/12; 198/619; 198/805; 198/831
(58) Field of Search .................. 198/619, 690.1, 198/805, 831; 310/12, 13, 14

(56) References Cited

U.S. PATENT DOCUMENTS

| | | | |
|---|---|---|---|
| 2,655,195 A | 10/1953 | Curtis .................. | 198/805 |
| 2,684,753 A | 7/1954 | Kolbe et al. .................. | 198/805 |
| 2,873,843 A | 2/1959 | Wilson .................. | 198/690.1 |
| 3,169,632 A | 2/1965 | Kain .................. | 198/805 |
| 3,179,241 A | 4/1965 | Kain .................. | 198/805 |
| 3,426,887 A | 2/1969 | Ward et al. .................. | 198/619 |
| 3,620,357 A | 11/1971 | Folkes .................. | 198/193 |
| 3,788,447 A | 1/1974 | Stepanoff .................. | 310/12 X |
| 4,643,298 A | 2/1987 | Wallaart .................. | 198/805 |
| 4,823,939 A | * 4/1989 | Langhans et al. .................. | 198/805 |
| 4,864,170 A | * 9/1989 | Eguchi .................. | 310/12 |
| 4,981,208 A | 1/1991 | Jones .................. | 198/778 |
| 5,027,942 A | 7/1991 | Wallaart .................. | 198/805 |
| 5,165,527 A | 11/1992 | Garbagnati .................. | 198/805 |
| 5,172,803 A | 12/1992 | Lewin .................. | 198/619 |
| 5,199,551 A | 4/1993 | Wallaart et al. .................. | 198/805 |
| 5,295,568 A | 3/1994 | Saito et al. .................. | 198/330 |
| 5,398,804 A | 3/1995 | Ecker et al. .................. | 198/619 |
| 5,890,583 A | 4/1999 | Garbagnati .................. | 198/805 |

* cited by examiner

*Primary Examiner*—Nestor Ramirez
*Assistant Examiner*—Judson H. Jones
(74) *Attorney, Agent, or Firm*—Kenneth F. Pearce

(57) ABSTRACT

The invention is related to induction drives for either straight or curved conveyors as well as methods of driving endless conveyor belts. Pivotable magnets are free floating in holders or interconnected to create a virtual continuous magnetic body. When the virtual continuous magnetic body encounters the stator's electromagnetic field the resultant magnetic flux pushes the continuous magnetic body through the groove of the conveyor bed. The pivotable magnets are dimensioned so they will not interlock with each other, as their pathways are reversed.

33 Claims, 18 Drawing Sheets

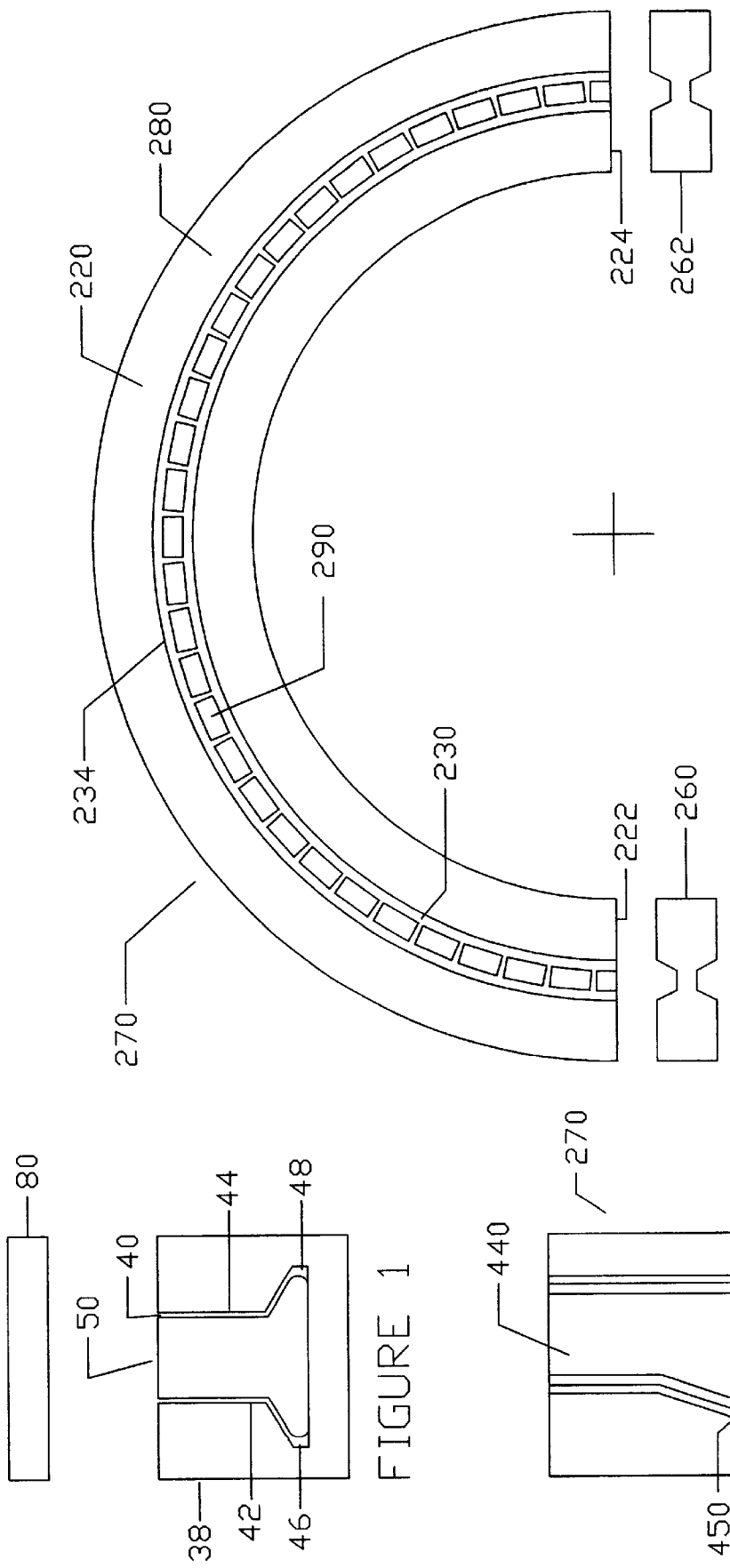

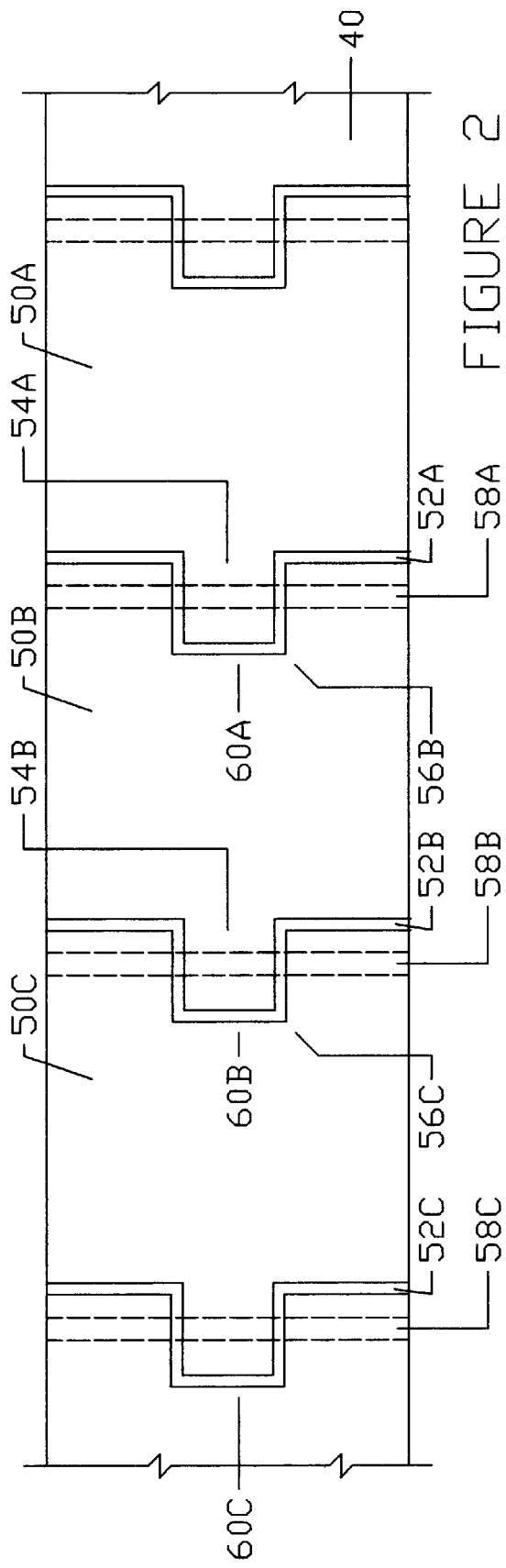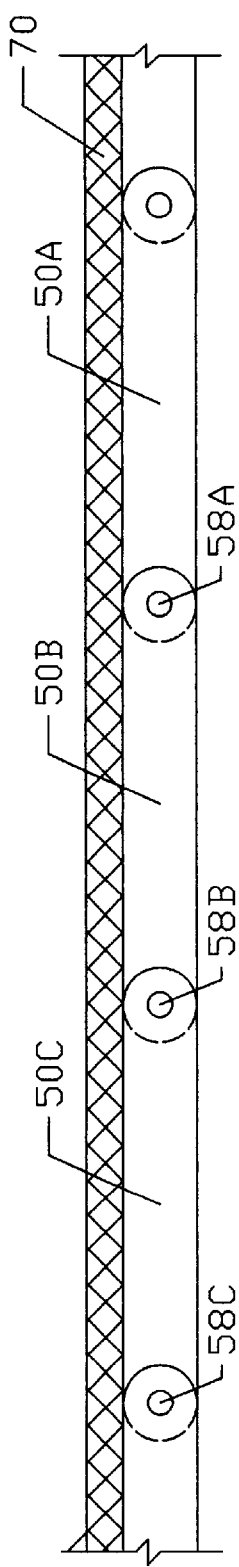

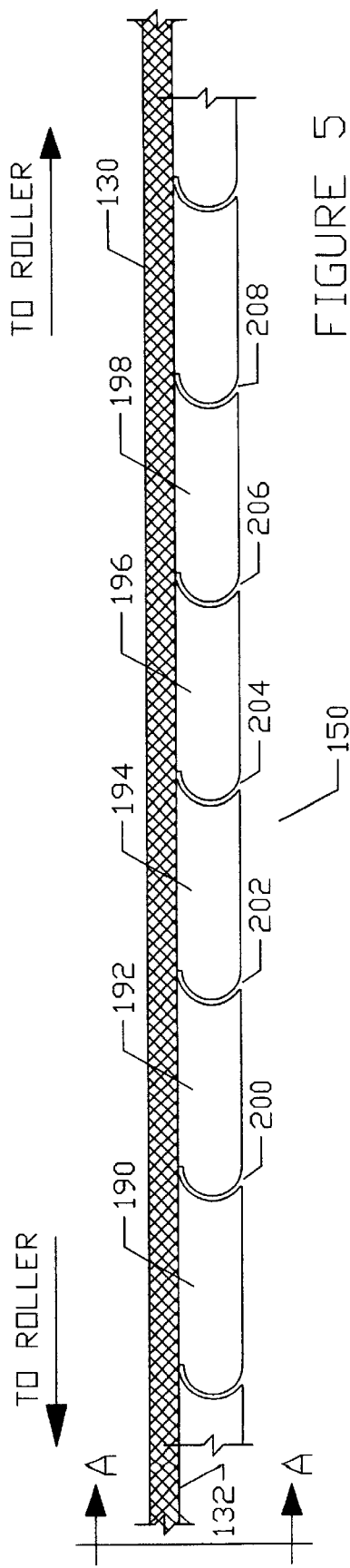
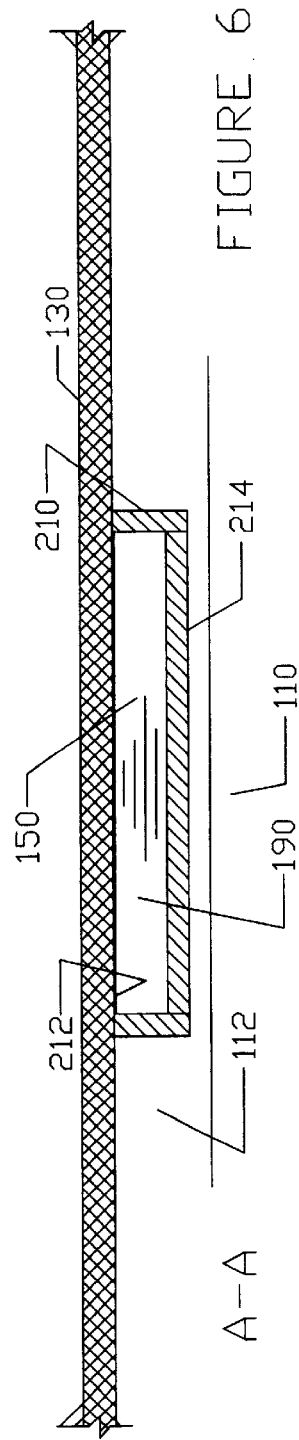
FIGURE 5
FIGURE 6

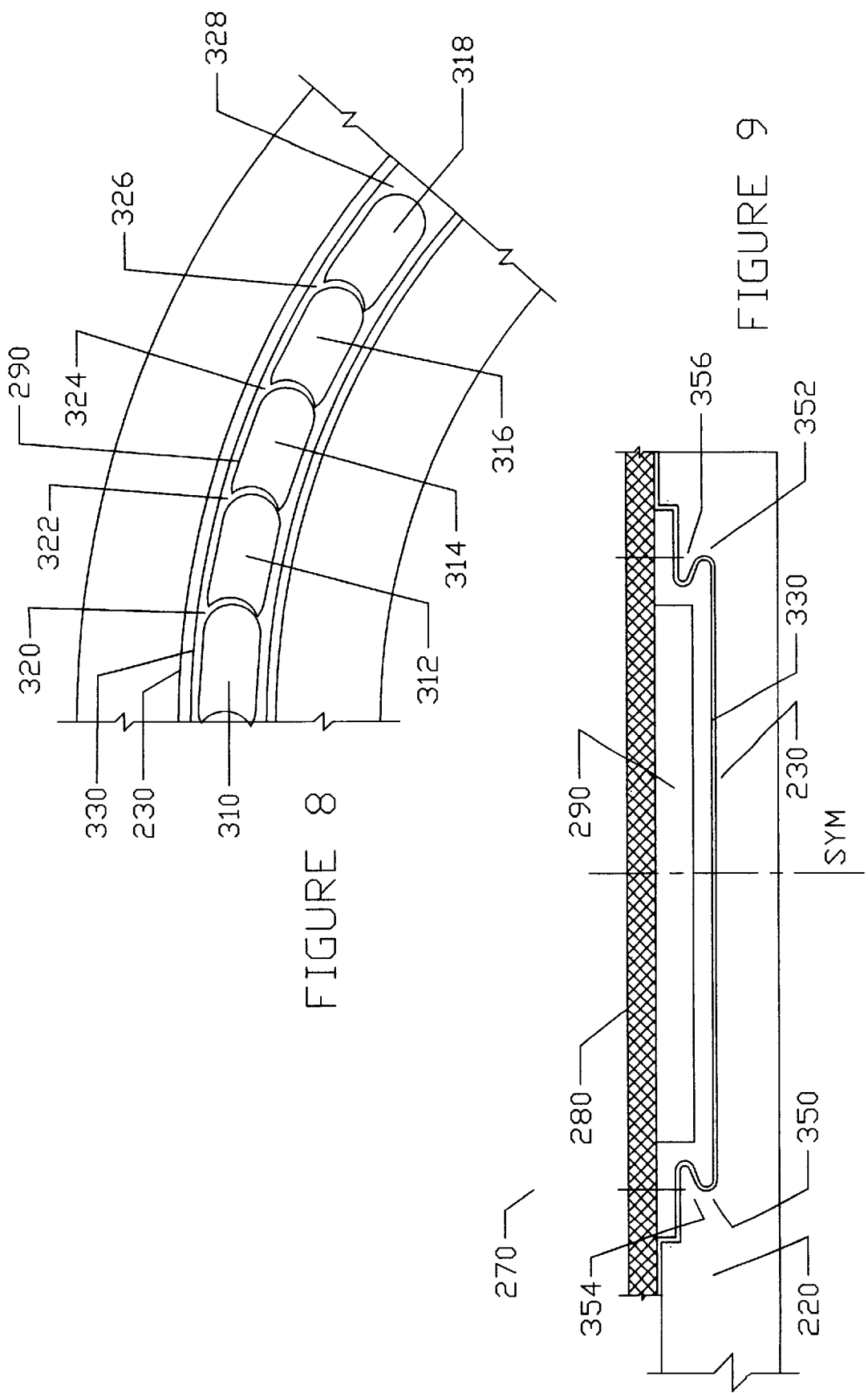

INDUCTION DRIVE FOR INDUCTION DRIVEN CONVEYOR INCLUDING A VIRTUAL CONTINUOUS MAGNETIC BODY AND METHOD OF DRIVING INDUCTION DRIVEN CONVEYOR INCLUDING A VIRTUAL CONTINUOUS MAGNETIC BODY

BACKGROUND OF THE INVENTION

1. Field of the Invention

Among other things, the present invention is related to induction drives for either straight or curved conveyors as well as methods of driving endless conveyor belts. Generally, pivotable magnets are interconnected serially and dimensioned to traverse a groove of the conveyor bed which can be either straight or curved. The series of pivotable magnets renders a virtual continuous magnetic body, and upon encountering the stator's electromagnetic field, a magnetic flux for driving the virtual continuous magnetic body is created. Select embodiments of the present invention incorporate free floating pivotable magnets housed in a holder attached to the nonmagnetic endless conveyor belt and dimensioned to ride the groove of the conveyor bed. Either the holder or the magnets can be dimensioned to ride in a track of the side wall of the conveyor bed's groove. And still in accordance with the present invention, the conveyor's direction can easily be reversed by altering the direction of the electric current flowing through the stator or stators while, at the same time, the pivotable magnets are dimensioned so they will not interlock with each other, as the conveyor's direction is reversed. In other words, the pivotable magnets are sized to move through the groove's curves, as well as about rollers that alters the course or direction of the conveyor belt.

2. Description of the Previous Art a) U.S. Pat. No. 5,172,803—Lewin, discloses a conveyor belt having a magnetic motor linear drive. Endless belt (2) is spanned over downstream and upstream rollers (33) and (34). Belt (2) has an inner surface (10) provided at each of the reinforced zones (6), (7) and (8) with ridge (9) in which is imbedded permanent magnet (5). Under each magnet (5) is a respective stator (4) that can be energized by alternating current. Along with teaching rectangular, flat, cylindrical, ridged, particulate, meshed, powdered permanent magnets embedded into belt (2), the '803 Patent also describes embedding magnets (5) into ridge (58). According to Lewin, his permanent magnets are fixed to the linear surface of the belt in combination with a juxtaposed stator form a linear motor for advancing his upper stretch downstream.

b) U.S. Pat. No. 2,655,195—Curtis enables a rubberized magnetic conveyor belt. The '195 Patent's flexible resilient rubber-like layers 12 including the Curtis magnetic composition are impregnated into and disposed over layers 11 by frictioning or coating and serve to bond layers 11 into the belt carcass.

c) U.S. Pat. No. 2,684,753—Kolbe, et. al., enables a magnetic drive for conveyor belts. Each of the drive units (16) includes traction belt (20) that is guided over end rollers (22). One of the rollers (22) receives pulley belt (24) which is directed by pulley (26) that is driven by conventional electric motor (24) connected to standard gear reducer (30). Disposed below each roller (34) is the electromagnetic roll (38) wound about an armature curved to conform with roller (34).

d) U.S. Pat. No. 2,873,843—Wilson discloses a conveyor for moving ferromagnetic license plates. Magnets (32) are secured to the outer surface of inner belt (15) while outer belt (12) is provided with apertures (24). Drive motor (40) turns drive shaft (42) of pulley (26) which rotates inner conveyor (14). When Wilson's magnets (32) contact the surface of the license plates, the license plates are held on the conveyor via magnetic attraction.

e) U.S. Pat. No. 3,169,632—Kain enables a magnetic flexible cable that has been incorporated into the conveyor belt. The Kain magnet is mounted in a trough underneath the conveyor belt.

f) U.S. Pat. No. 3,620,357—Folkes teaches primarily a belt conveyor for passengers. The '357 Patent's belt is supported by magnetic repulsion. Magnetization is such that polarity of outer surface of layer (15) and the outer surface of layer (17) are the same. Thus, in use there is a distributed upward thrust on the belt. Primarily, Folkes utilizes barium ferrite for his magnetizable material distributed in his belt, but strontium as well as lead ferrite also are functional.

g) U.S. Pat. No. 4,643,298—Wallaart enables a magnetic bend for a chain conveyor. Wallaart's base includes two upright legs (2 & 3) that form the rails for the conveyor chain. Permanent magnets (7) are inserted into pockets (13) are formed on the underneath side of legs (2&3). Compressible plastic or rubber (8) between the closure strip (10) and magnet (7) ensure the magnets in pockets (13) are pushed upwards in the bend segment to enable the magnets to exert maximum force of attraction on the chain links (4).

h) U.S. Pat. No. 5,890,583—Garbagnati discloses a magnetic curve for a chain conveyor. Curve (10) includes base (11) and slide portion (12) to which chain conveyor (13) is fastened. Operation of the curve is accomplished by attaching ferromagnets (17) to guide (12) with screws (18).

i) U.S. Pat. No. 5,295,568—Saito, et. al., enables a passenger conveyor. Generally, the conveyor's treadboards move horizontally, but the conveyor can also be utilized as an inclined escalator. Regardless of which Saito embodiment is selected, the flattened linear motor's stators and moving members are positioned horizontally between the advance and return travel paths of the treadboards. Additionally, the '568 Patent teaches that moving member (12) is composed of a nonmagnetic conductor such as aluminum and copper, or a nonmagnetic conductor laminated on the surface of the magnetic material. Moving members (12) are fixed securely to reinforcement member (7B) mounted on the reverse side of treadboard (5). Stators (13) are supported by horizontal members (3) of frame (1) so as to be opposed to moving members (12a & 12b). Energizing stators (13) apply driving force to moving members (12) to move treadboards (5) along advance (4U) and return (4D) guide rails.

j) U.S. Pat. No. 3,788,447—Stephanoff describes a linear motor conveyor. Stephanoff's guide track (20) includes two halves that are spaced apart to define a slot (40) therebetween. Except for the curve from upper transport run (12a) to lower return run (12b), support surfaces (30 & 32) of guide (20) are horizontal. Vertical stem (18) of conveyor segment (16) is conducting non magnetic copper or aluminum so that a propulsive force will be generated on stem (18) by the traveling field in stators (62). Stators (62) are located on both sides of slot (40) or a laminated core (74) is mounted in guide (20) to provide the return path for electromagnetic flux. Propulsive force in registration with the linear motor stators causes the entire conveyor to circulate around the guide.

k) U.S. Pat. No. 5,027,942—Wallaart teaches a hinged chain conveyor. Rails 3 and 4 have permanent magnets 9 and 10 inserted into at least the bend sections of the rails.

l) U.S. Pat. No. 5,165,527—Garbagnati enables a chain conveyor that includes a magnetizable chain. Magnets (19) are inserted into grooves (15 & 16) of shoulders (11 & 12) of guide track (10) to assist in controlling ferromagnetic chain (14) as the chain moves through bends of the conveyor.

m) U.S. Pat. No. 5,199,551—Wallaart, et. al., discloses a bend segment for a chain conveyor. Permanent magnets (8) are arranged in chambers of plastic bend segment.

n) U.S. Pat. No. 5,298,804—Ecker, et. al., enables a curved conveyor belt with supporting frame devoid of belt band rollers. On the opposite side of stator (12), guide ducts (10 & 11) include recess (14) through which running wheel carrier (15) grasps carrying bar (16) and wheels (25 & 26). Wheel carrier (15) is connected to side edges (18 & 19) of belt band (2). Drive is applied via linear motor system (4) that includes stator (12) and magnet (23) that is integrated with crossbar (22) of carrying spar (16).

o) U.S. Pat. No. 3,426,887—Ward, et. al., among other things, discloses the use of introducing a metal strip or applying metallic particulars to the lateral edges of a nonmetallic conveyor belt. The combination of the coil and the ferrous metallic edge forms a type of the Ward linear induction motor. The '887 Patent's disclosure is limited to mechanisms that convey in the horizontal plane.

p) U.S. Pat. No. 4,981,208—Jones enables a magnetic spiral conveyor system. Among other things, Jones teaches embedding permanent magnets (32) into the exposed edge of module (28) which contacts the driving bars (26) of the system. In this manner, frictional contact between the conveyor belt and the driving bars is increased.

SUMMARY OF THE INVENTION

Unlike traditional induction driven conveyors, the present invention does not require use of chains or bead guidance devices to control and/or measure the pathway and/or distance traveled by the endless conveyor belts associated with curved conveyors. At the same time and still in accordance with the current invention, the virtual magnetic body can pull, i.e., drive, either straight or curved conveyors. Pivotable magnets incorporated into the virtual magnetic body can be connected to the endless conveyor belt in any manner acceptable in the art, including but not limited to nuts and bolts, rivets, thread or adhesives. Additionally, the magnets can be dimensioned to ride in tracks of the side walls of the conveyor bed's groove, or they can float freely in a holder that is attached to conveyor belt. In one embodiment, the pivotable magnets are hinged with each previous and each subsequent pivotable magnet to interconnect serially the members of the virtual continuous magnetic body. A protective coating can be applied to the pivotable magnets to enhance their effective working life.

An object of the present invention is to provide a bi-directional traveling magnet.

Still another object of the present invention is to provide an induction drive for a conveyor.

It is another object of the present invention to enable a method of using an induction driven conveyor.

Yet another object of the present invention is to provide a drive for an endless belt incorporating a plurality of serially interconnected pivotable magnets, wherein each pivotable magnet is also attached individually to the endless belt.

Still another object of the present invention is to provide a drive including a hinged pivotable magnet.

Yet still another object of the present invention is provide an induction driven conveyor that does not require use of chain guidance.

It is yet another object of the present invention to provide an induction driven conveyor that does not require use of bead guidance.

Still another object of the present invention is to provide a bi-directional induction driven conveyor where the direction of conveyor is reversible by altering the direction of the electric current flowing through the stator.

Yet still another object of the present invention is provide an induction driven conveyor utilizing at least two stators for generating a cumulative electromagnetic field.

It is yet still another object of the present invention to provide a pivotable magnet dimensioned for riding in the track of a side wall of the bed's groove.

Still another object of the present invention is to provide a virtual continuous magnetic body having a plurality of free floating pivotable magnets contained within a holder that is dimensioned for riding in the groove of the conveyor bed.

Yet still another object of the present invention is to provide a virtual continuous magnetic body having a protective coating for enhancing the life of the pivotable magnets.

It is yet another object of the present invention to provide an induction drive that can be utilized in either a straight or a curved conveyor.

Still another object of the present invention is to provide an induction drive that can generate from about 248 Watts to about 7.5 Kilowatts.

An embodiment of the present invention can be described as a flux dependent plurality of bi-directional traveling magnets, comprising: a bed in which the traveling magnets move, wherein the bed further includes: a groove running a length of said bed including a first side having a first track for interlocking the traveling magnets, a second side having a second track for interlocking the traveling magnets opposite of and substantially parallel to the first side; a stator including a face projecting an electromagnetic field toward the plurality of traveling magnets; a switch for controlling direction of electric current flowing through the stator such that the plurality of traveling magnets move through the groove in response to a current dependent flux generated between the first stator and the plurality of traveling magnets; a virtual continuous magnetic body rendered by a cooperation of adjacent and overlapping members of the plurality of traveling magnets and the electromagnetic field; and wherein each of the plurality of traveling magnets further comprises: a dimension for interlocking the first track and the second track of said groove, and a hinge for interconnecting serially an adjacent member of said plurality of traveling magnets.

Another embodiment of the present apparatus can be described as an electromagnetic induction driven bi-directional conveyor, comprising: a frame; a guide supported by the frame, wherein said guide further comprises: a bed having a groove running a length of the including a first side, and a second side opposite of and substantially parallel to the first side; a first roller, having a notch, located near a first distal edge of the bed; a second roller, having a notch, located near a second distal edge of the bed opposite the first distal edge of the bed; an endless nonmagnetic belt directed by the guide, wherein the endless nonmagnetic belt further comprises: a roller engaging side, and a non-roller engaging side opposite the roller engaging side; a first stator including a face projecting a first electromagnetic field toward the roller engaging side of the endless nonmagnetic belt; and a plurality of pivotable magnets serially interconnected to each other and individually attached to the nonmagnetic belt such that the pivotable magnets traverse, in series, the groove in response to a magnetic flux created between the first stator's face and the pivotable magnets encountering the first electromagnetic field.

Yet another embodiment of the present device can be described as an electromagnetic induction driven bi-directional conveyor, comprising: a frame; a guide supported by the frame, wherein the guide further comprises: a bed having a groove running a length of the bed including a first side having a first track and a second side opposite of and substantially parallel to the first side, a first roller, having a notch, located near a first distal edge of the bed and a second roller, having a notch, located near a second distal edge of the bed opposite the first distal edge of the bed; an endless nonmagnetic belt directed by the guide, wherein the endless nonmagnetic belt further comprises: a roller engaging side and a non-roller engaging side opposite the roller engaging side; a first stator, including a first face projecting a first electromagnetic field toward the roller engaging side of the endless nonmagnetic belt, mounted to the frame; a second stator, including a second face projecting a second electromagnetic field toward the non-roller engaging side of the endless nonmagnetic belt, mounted to the frame; a plurality of overlapping pivotable serially hinged magnets attached to the nonmagnetic belt such that the overlapping pivotable serially hinged magnets ride in the track of the groove; and render a virtual continuous magnetic body for driving the bi-directional conveyor, traverse, in series, the groove in response to a cumulative magnetic flux created between the first and the second electromagnetic fields and the virtual continuous magnetic body encountering the first and the second electromagnetic fields and rotate, in series, about the first and the second roller; and a protectant for the virtual continuous magnetic body.

In still another embodiment, the present invention can be described as an electromagnetic induction driven bi-directional conveyor, comprising: a frame; a guide supported by the frame, wherein the guide further comprises: a bed having a groove running a length of the bed; and wherein the groove further includes: a first side and a second side opposite of and substantially parallel to the first side; a first roller, having a notch, located near a first distal edge of the bed; a second roller, having a notch, located near a second distal edge of the bed opposite the first distal edge of the bed; an endless nonmagnetic belt directed by the guide, wherein the endless nonmagnetic belt further comprises: a roller engaging side and a non-roller engaging side opposite the roller engaging side; a first stator including a face projecting a first electromagnetic field toward the roller engaging side of the endless nonmagnetic belt; and a holder attached to the endless nonmagnetic belt and containing a plurality of pivotable magnets such that the holder traverses the groove in response to a magnetic flux created between the first stator's face and the pivotable magnets encountering the first electromagnetic field.

Yet another embodiment of the present device can be described as an electromagnetic induction driven bi-directional conveyor, comprising: a frame; a guide supported by the frame, wherein the guide further comprises: a bed having a groove running a length of the bed including a first side having a first track and a second side opposite of and substantially parallel to the first side, a first roller, having a notch, located near a first distal edge of the bed and a second roller, having a notch, located near a second distal edge of the bed opposite the first distal edge of the bed; an endless nonmagnetic belt directed by said guide, wherein the endless nonmagnetic belt further comprises: a roller engaging side and a non-roller engaging side opposite the roller engaging side; a first stator, including a first face projecting a first electromagnetic field toward the roller engaging side of the endless nonmagnetic belt, mounted to the frame; a second stator, including a second face projecting a second electromagnetic field toward the non-roller engaging side of the endless nonmagnetic belt, mounted to the frame; and a bendable holder attached to the endless nonmagnetic belt for traversing the groove: wherein the bendable holder further contains a plurality of pivotable magnets such that the bendable holder traverses the groove in response to a cumulative magnetic flux created between the first stator's face, the second stator's face and the pivotable magnets encountering the first electromagnetic field and the second electromagnetic field, and wherein the holder is dimensioned to ride in a track in a side of the groove, and wherein each of the plurality of pivotable magnets is hinged serially to each previous and each subsequent pivotable magnet.

Still another embodiment of the present invention can be described as a method of driving a nonmagnetic endless conveyor belt, comprising the steps of: mounting a bed, including a groove, to a frame for supporting the nonmagnetic endless conveyor belt; locating a notched roller at each end of the bed for altering direction of the nonmagnetic endless conveyor belt; attaching a plurality of pivotable magnets to the nonmagnetic endless conveyor belt; dimensioning each of the plurality of pivotable magnets to ride in the groove; serially interconnecting each of the plurality of pivotable magnets such that a virtual continuous magnetic body is created; positioning a first stator to face a roller engaging side of the nonmagnetic endless conveyor belt; energizing the first stator to generate a magnetic flux between the first stator and the virtual continuous magnetic body encountering the first stator's electromagnetic field; using the magnetic flux created between the first stator's electromagnetic field and the virtual continuous magnetic body to push the continuous magnetic body; guiding the virtual continuous magnetic body through the groove and about the notches; and pulling the nonmetallic endless conveyor belt with the virtual continuous magnetic body.

Yet another embodiment of the present invention can be described as a method of driving a nonmagnetic endless conveyor belt, comprising the steps of: mounting a bed, including a groove, to a frame for supporting the nonmagnetic endless conveyor belt; locating a notched roller at each end of the bed for altering direction of the nonmagnetic endless conveyor belt; containing a plurality of free floating pivotable magnets inside a bendable holder such that a virtual continuous magnetic body is created; dimensioning the bendable holder to ride in the groove; positioning a first stator to face a roller engaging side of the nonmagnetic endless conveyor belt; energizing the first stator to generate a magnetic flux between the first stator and the virtual continuous magnetic body encountering the first stator's electromagnetic field; using the magnetic flux created between the first stator's electromagnetic field and the virtual continuous magnetic body to push the continuous magnetic body; guiding the virtual continuous magnetic body through the groove and about the notches; and pulling the nonmetallic endless conveyor belt with the virtual continuous magnetic body.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

FIG. 1 is a cross-section end view of a bed having a groove. therein.

FIG. 2 is top view of groove of a bed, in accordance with an embodiment of the present invention.

FIG. 3 is side view of hinged magnets, within the ambit of the present invention.

FIG. 5 is side view of an embodiment of the virtual continuous magnetic body, within the scope of the present invention.

FIG. 6 is an end view of a virtual continuous magnetic body, in accordance with the current invention.

FIG. 7 is a top view of a curved conveyor embodiment of the present invention, with the nonmagnetic endless conveyor belt cut away.

FIG. 8 is a close-up of FIG. 7's virtual magnetic body.

FIG. 9 is a cross-sectional view of an embodiment of the present invention incorporating a holder.

FIG. 11 is a cross-sectional view of another embodiment of the virtual continuous magnetic body having a dimension to ride in the track of the side wall of the groove, within the scope of the present invention.

DESCRIPTION OF THE PREFERRED EMBODIMENTS

Figure 4:
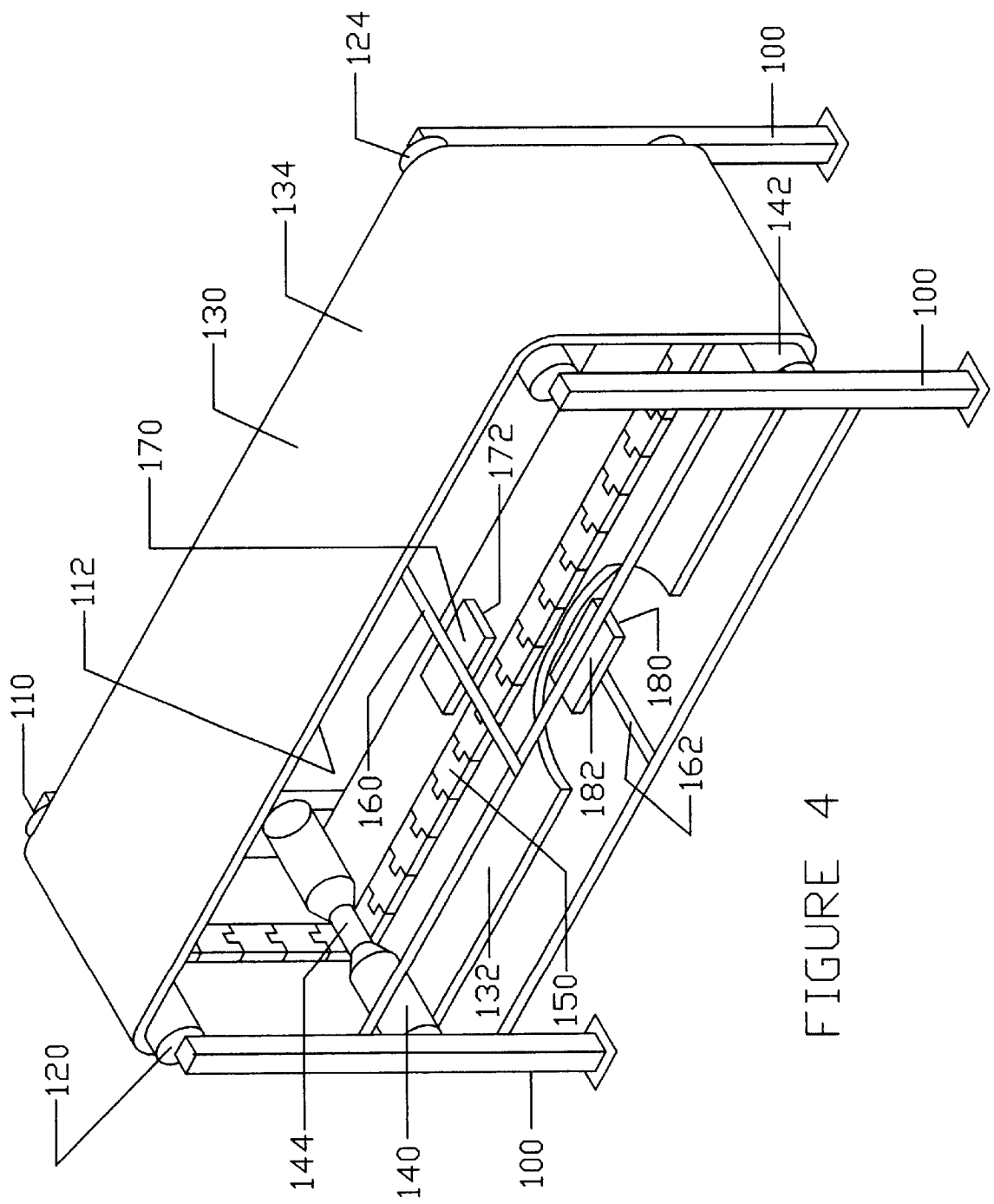
FIG. 4 is side view pictorial of a straight conveyor utilizing an embodiment of the present invention.

Although the disclosure hereof is detailed to enable those skilled in the art to practice the invention, the embodiments published herein merely exemplify the present invention.

In accordance with the current invention, traveling magnets, pivotable magnets or virtual continuous magnetic bodies are made of either ferromagnetic or rare earth magnetic compositions. Due to the magnetic flux generated between at least one stator and the magnetic compositions, the traveling magnets, pivotable magnets or virtual continuous magnetic bodies move about or traverse grooves of beds. In select embodiments, the bed is part of the guide that directs an endless nonmagnetic belt of the type frequently associated with conveying devices.

FIG. 1 is a cross-sectional end view of bed (38). A simplified embodiment of a flux dependent bi-directional traveling magnet (50) is depicted. Magnet (50) is dimensioned to ride in tracks (46) and (48) formed in side walls (42) and (44) of groove (40) of bed (38). Stator (80) has a switch (not shown) for controlling the direction of electric current flowing through stator (80). Electric current flowing through stator (80) creates a magnetic flux with traveling magnet (50). Those skilled in the art recognize that the movement of traveling magnet (50) through groove (40) is dependent upon the direction of current flowing through stator (80).

FIG. 2, a top view of a portion of groove (40) of bed (38), exemplifies a plurality of traveling magnets (50A, 50B and 50C) interconnected serially and riding in groove (40) of bed (38). Serially interconnected traveling magnets (50A, 50B and 50C) are provided with clearances (52A, 52B and 52C) which allow traveling magnets (50A, 50B and 50C) to move through a curve (not shown) of groove (40). In this specific embodiment, traveling magnet (50A) includes jut (54A) protruding into recess (56B) of traveling magnet (50B) while traveling magnet (50B) has jut (54B) protruding into recess (56C) of traveling magnet (50C). By utilizing pens (58A, 58B and 58C) in combination with the previously identified juts and recess, hinges (60A, 60B and 60C) are created.

FIG. 3 is a side view of hinged magnets (50A, 50B and 50C) showing pens (58A, 58B and 58C). As shown, carrier (70) for transporting an item is attached to a plurality of serially interconnected traveling magnets. Thus, in one embodiment of the present invention, switching the direction of electric current flowing through stator (80) results in carrier (70) oscillating between positions R and L.

Within the scope of the present invention, hinged and serially interconnected traveling magnets can render a virtual continuous magnetic body. As portrayed in FIG. 2, the combination of traveling magnets (50A, 50B and 50C) and the clearances therebetween render a virtual continuous magnetic body capable of traversing a curve (not shown) in groove (40). Moreover, serially interconnected magnets (50A, 50B and 50C) can be provided with a protective coating to enhance their working life.

Although the present invention is also functional in conjunction with a curved conveyor, for ease of understanding the interrelationship of certain elements, a straight conveyor is depicted in FIG. 4. Frame (100) supports guide (110). And in this particular embodiment, guide (110) is provided with bed (112), first roller (120) having a notch (not shown) proximate to a first distal edge of bed (112) and second roller (124) also having a notch (not shown) proximate to a second distal edge of bed (112). Bed (112), first roller (120) and second roller (124) are mounted to frame (100) in any manner acceptable in the art that will direct nonmagnetic endless conveyor belt (130) to traverse bed (112) and about first roller (120) and second roller (124).

Mounted to frame (100), in any manner acceptable in the art, and positioned below bed (112) are return rollers (140 and 142). Although only two return rollers are depicted, those skilled in the art comprehend that more than two return rollers can be incorporated into other embodiments of the present invention. In this specific embodiment, return roller (140) is provided with notch (144) through which virtual continuous magnetic body (150) circulates about the conveyor. Notch (144) is similar if not identical to the notches of first roller (120) and second roller (124) not shown in this perspective.

Virtual continuous magnetic body (150), for driving nonmagnetic endless conveyor belt (130), is attached to roller engaging side (132) of nonmagnetic endless conveyor belt (130). The virtual continuous magnetic body (150) can be attached to roller engaging side (132) of nonmagnetic endless conveyor belt (130) by any manner acceptable in the art, such as, bolts, rivets, adhesives or thread. First support (160) mounted to frame (100) suspends first stator (170) having face (172) for projecting a first electromagnetic field toward virtual magnetic body (150) and roller engaging side (132) of nonmagnetic endless conveyor belt (130). Second support (162) mounted to frame (100) carries second stator (180) having face (182) for projecting a second electromagnetic field toward non-roller engaging side (134) of nonmagnetic endless conveyor belt (130).

Although the embodiment portrayed in FIG. 4 incorporates two stators, those skilled in the art recognize that the present invention will also function with a single stator. The two stator embodiment can generate a cumulative magnetic flux between the first and second electromagnetic fields projected by first stator (170) and second stator (180) for driving the endless conveyor belt (130). And depending upon the weight of the materials to be carried by the nonmagnetic endless conveyor belt, a stator can be configured to generate from about 248 Watts to about 7.5 Kilowatts. As previously disclosed with the traveling magnets, above, the direction of nonmagnetic endless conveyor belt (130) is reversed by altering the direction of the electric current flowing through the stators or stator. Moreover, a plurality of serially hinged traveling magnets, as shown in FIGS. 2 and 3, are within the scope of this particular embodiment.

FIG. 5 is a side view of an embodiment of a virtual continuous magnetic body (150) of the present invention. A plurality of pivotable magnets (190, 192, 194, 196 and 198) are attached to roller engaging side (132) of nonmagnetic endless conveyor belt (130). The plurality of pivotable magnets (190, 192, 194, 196 and 198) are dimensioned to traverse through a groove and the roller's notches as well as about the rollers. Importantly, clearances (200, 202, 204, 206 and 208) located between serially interconnected pivotable magnets (190, 192, 194, 196 and 198) are dimensioned to allow virtual continuous magnetic body (150) to move through a curve or radius (not shown) of a groove in the bed, as well as about the rollers, regardless of the direction in which the nonmagnetic endless conveyor belt (130) moves.

FIG. 6 is an end view of virtual continuous magnetic body (150) riding in groove (210) of bed (112) of guide (110). Adhesive (212) attaches pivotable magnet (190) to nonmagnetic endless conveyor belt (130). Protective coating (214) is applied to pivotable magnet (190) for enhancing the life of pivotable magnet (190). It has unexpectedly been determined that such configuration of continuous magnetic body (150) is particularly useful for straight conveyor embodiments.

FIG. 7 is a top view of a curved conveyor embodiment of the present invention, with the nonmagnetic endless conveyor belt cut away. First notched roller (260) is positioned near a first end (222) of curved bed (220) and notched second notched roller (262) is located near a second end (224) of curved bed (220). Groove (230) traverses the length of curved bed (220), and the combination of curved bed (220), groove (230), notched rollers (260 and 262) creates guide (270) for nonmagnetic endless conveyor belt (280). Virtual continuous magnetic body (290) is encased in a holder (not shown) and is dimensioned to pivot through curve (234) of groove (230), well as about guide (270).

FIG. 8 is a close-up of a section of FIG. 7's virtual continuous magnetic body (290). A plurality of pivotable magnets (310, 312, 314, 316 and 318) float freely in holder (330) riding in groove (230). The pivotable magnets (310, 312, 314, 316 and 318) are dimensioned to have clearances (320, 322, 324, 326 and 328) therebetween. Dependent upon the magnetic flux generated between the pivotable magnets and the stator (not shown), clearances (320, 322, 324, 326 and 328) allow pivotable magnets (310, 312, 314, 316 and 318) to move bidirectionally through groove (230).

FIG. 9 is an cross-sectional view of an embodiment of the present invention incorporating a holder for the virtual continuous magnetic body (290). Holder (330) is bendable for traversing curve (234) of groove (230), and dimensioned to hold a plurality of pivotable magnets, such as those shown in FIG. 8. Using any method acceptable in the art, holder (330) is sized to ride in tracks (350 and 352) of side walls (354 and 356) of groove (230) of bed (220) of guide (270). However, those skilled in art understand that holder could also be sized to ride only in a single track, for example, track (350).

As shown in FIG. 9, an adhesive attaches holder (330) to nonmagnetic endless conveyor belt (280). Thus, virtual continuous magnetic body (290) having a plurality of, for example, free floating pivotable magnets (310, 312, 314, 316 and 318), is encased between holder (330) and nonmagnetic endless conveyor belt (280) for traversing groove (230) of bed (220) of guide (270). However, those skilled in the art recognize that free floating pivotable magnets (310, 312, 314, 316 and 318) can just as easily be completely encased by holder (330). As used herein, "free floating pivotable magnets," shall indicate pivotable magnets that are not physically interconnected with each previous and each subsequent member of the group pivotable magnets.

Figure 10:
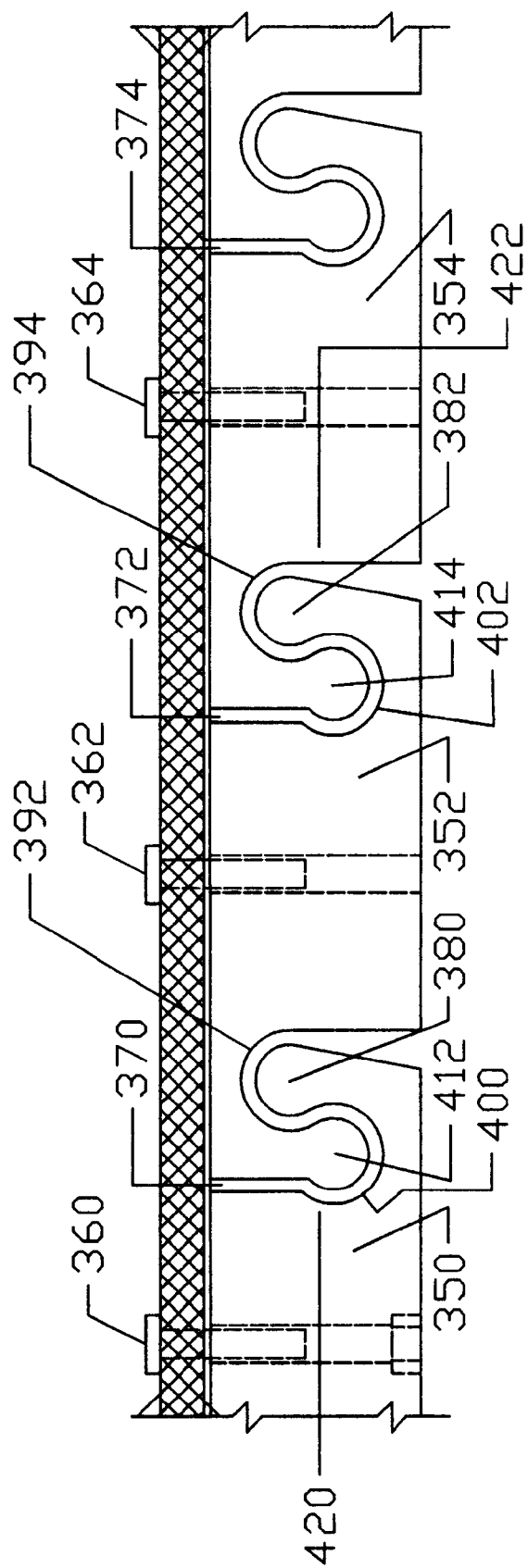
FIG. 10 is a side view of a plurality of serially interconnected pivotable magnets, within the ambit of the present invention.

FIG. 10 is a side view of a plurality of serially interconnected pivotable magnets (350, 352 and 354). In this specific embodiment, rivets (360, 362 and 364) attach pivotable magnets (350, 352 and 354) to endless conveyor belt (280) for traversing groove (230) of bed (220) of guide (270). Clearances (370, 372 and 374) are provided between pivotable magnets (350, 352 and 354) so that the pivotable magnets can traverse groove (230). As shown, pivotable magnets (350, 352 and 354) are interconnected serially. Jut (380) of pivotable magnet (350) and recess (392) of pivotable magnet (352) and receptacle (400) of pivotable magnet (350) and projection (412) of pivotable magnet (352) create hinge (420). And in a similar vein, jut (382) of pivotable magnet (352) and recess (394) of pivotable magnet (354) and receptacle (402) of pivotable magnet (352) and projection (414) of pivotable magnet (354) create hinge (422), so forth and so on. Although not shown in FIG. 10, this particular overlapping and serially hinged plurality of pivotable magnets can be encased in a holder or between a holder and the nonmagnetic endless conveyor belt.

FIG. 11 is a cross-sectional view of another embodiment of the virtual continuous magnetic body (440) having a dimension (450) to ride in track (430) of groove (230) of bed (220) of guide (270). Although as previously disclosed, a holder can encase virtual continuous magnetic body (440), in this specific embodiment, protective coating (442) about a series interconnected pivotable magnets (not shown) for enhancing the life of continuous magnetic body (440) is utilized.

Figure 12:
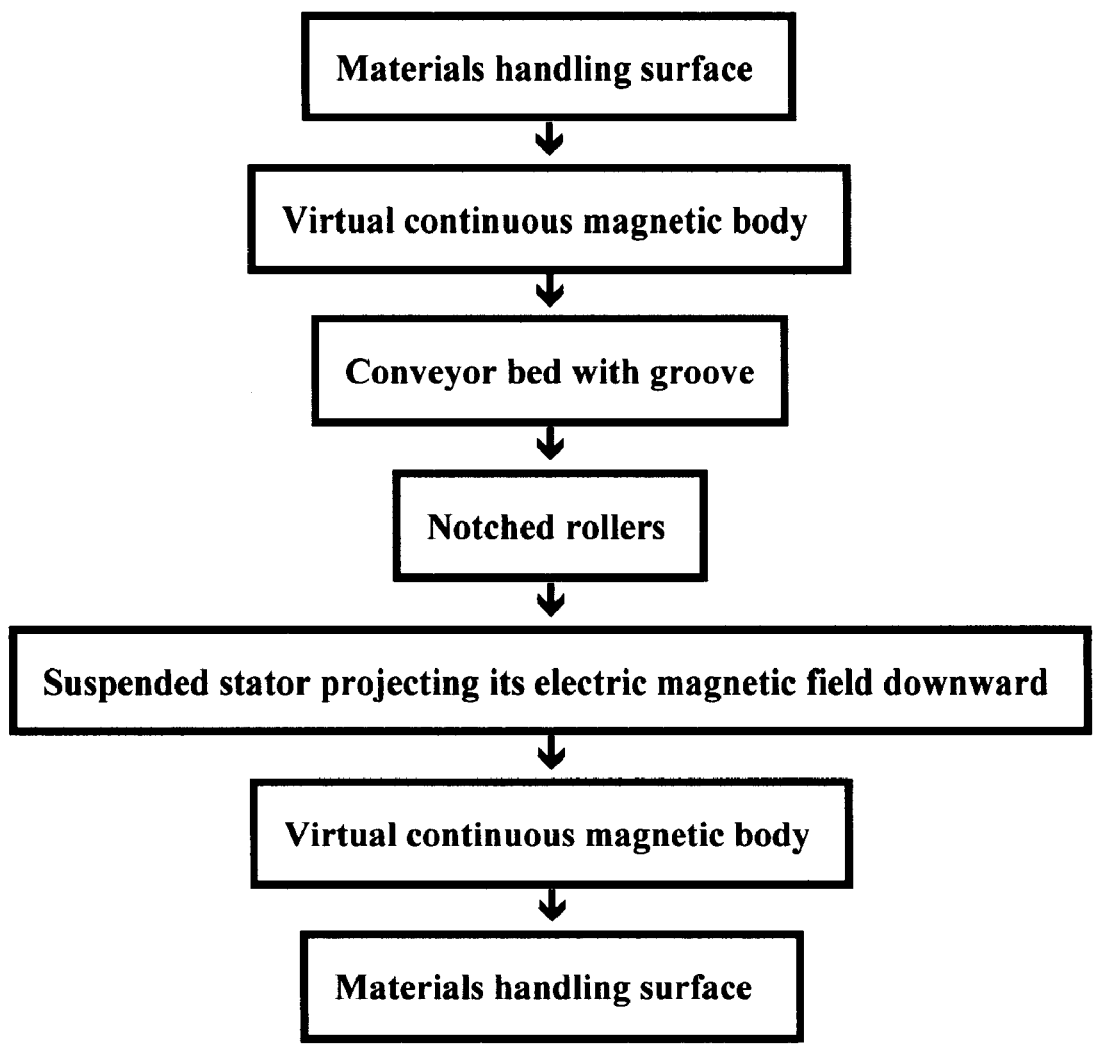
FIG. 12 is a a diagrammatic representation of a suggested arrangement of a single stator embodiment, within the scope of the present invention.
Figure 13:
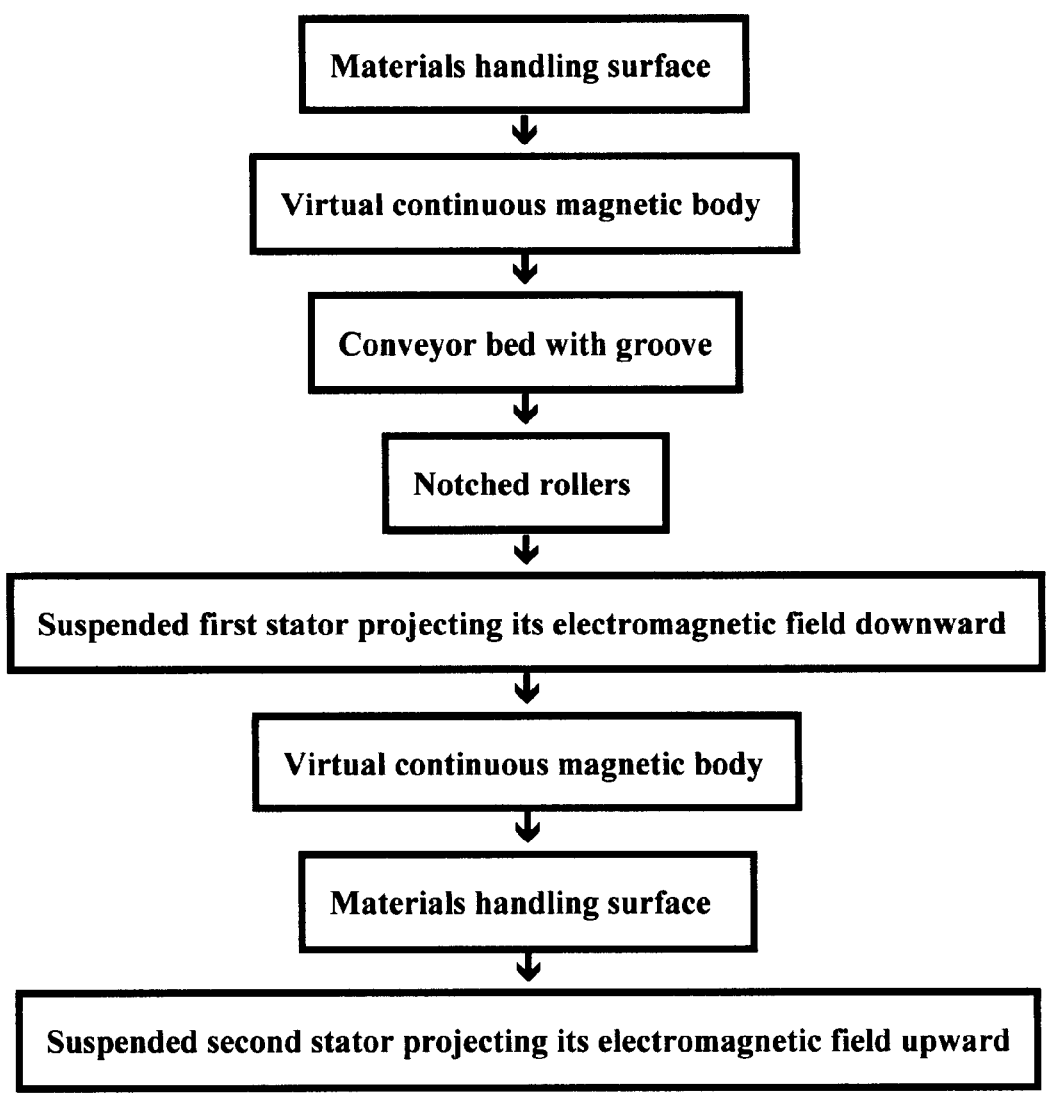
FIG. 13 is a a diagrammatic representation of a suggested arrangement of an embodiment utilizing two stators, within the ambit of the present invention.
Figure 14:
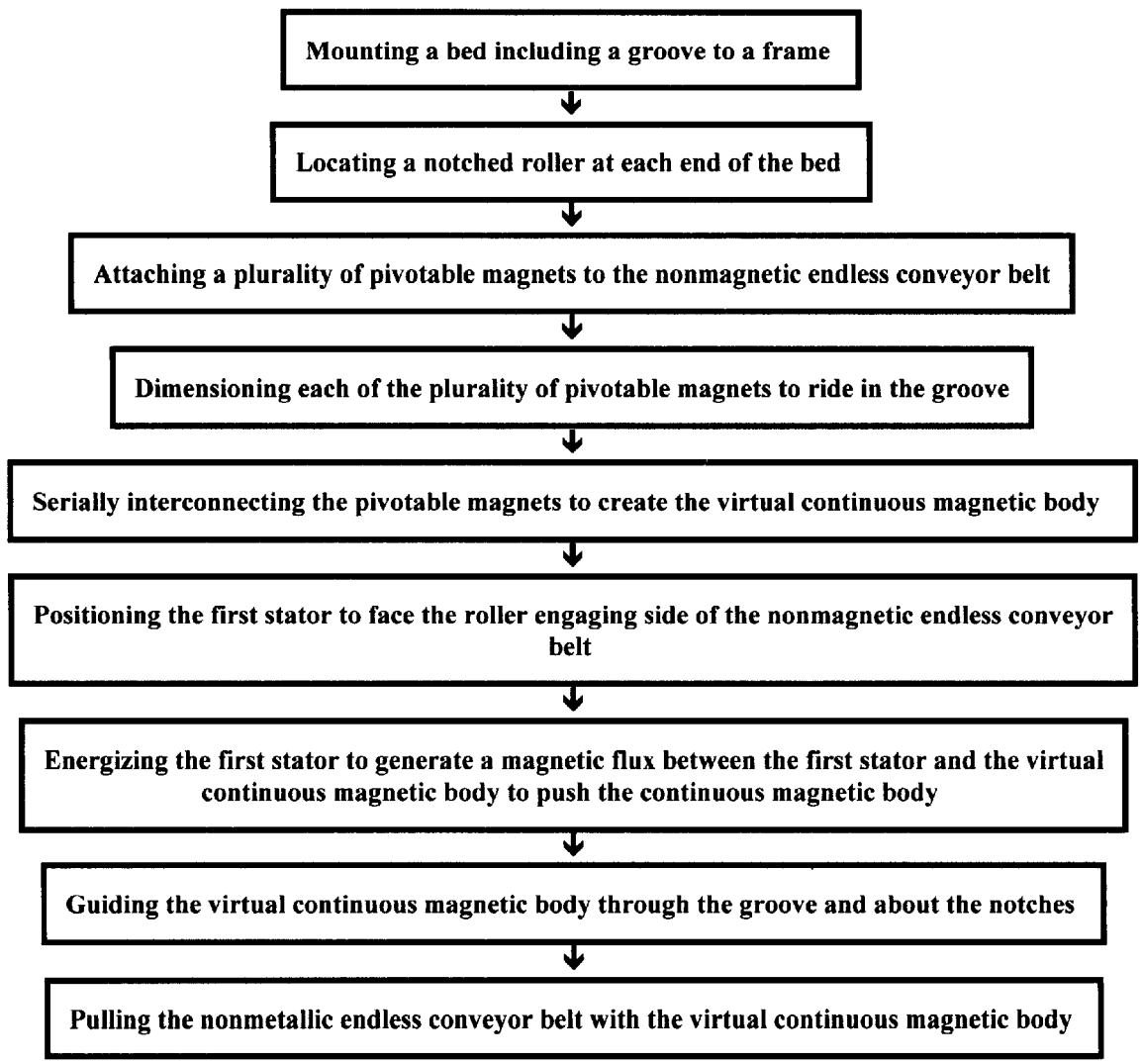
FIG. 14 is a depiction of the steps of an embodiment of the present invention.
Figure 15:
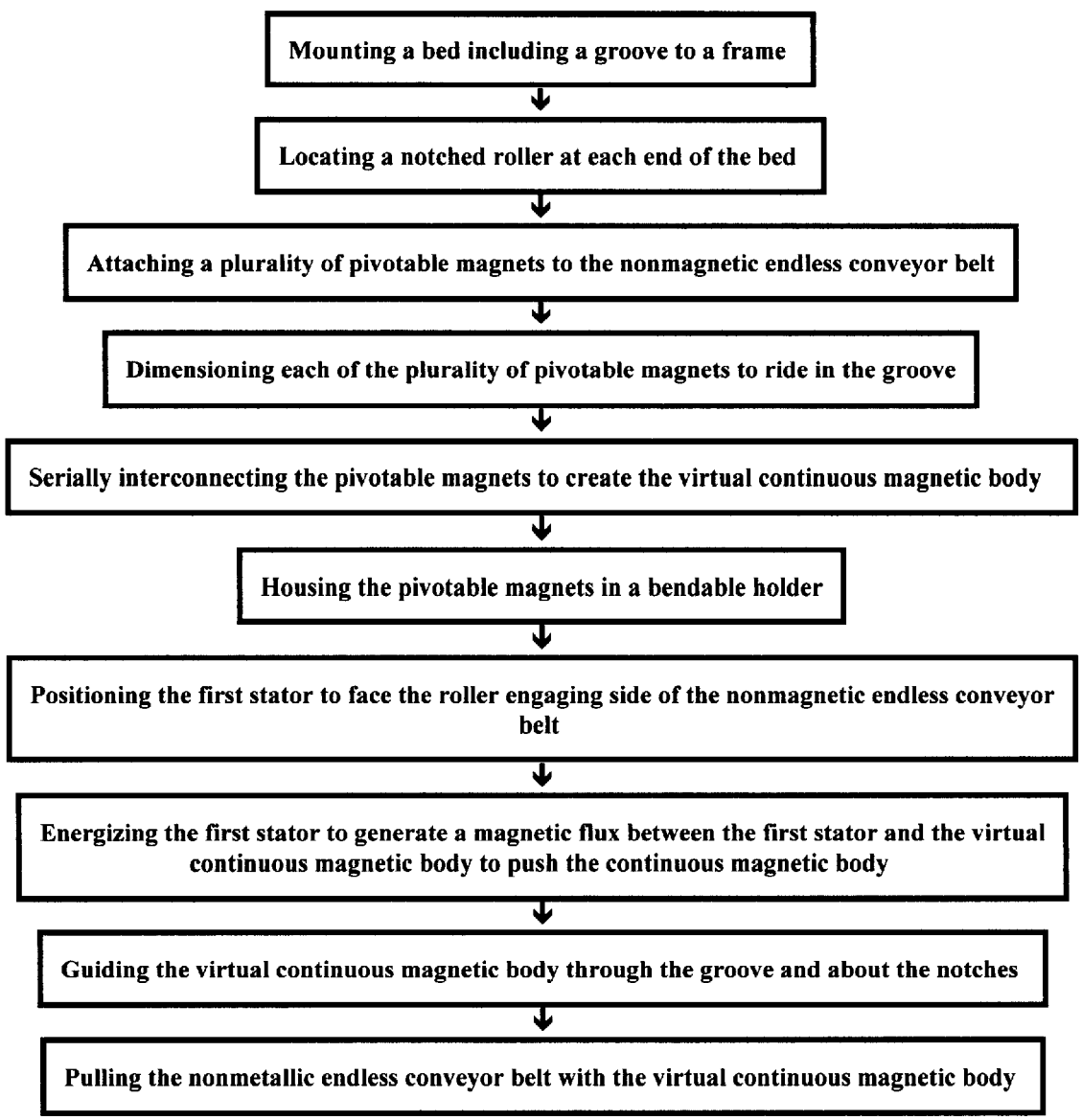
FIG. 15 is an exemplification of the steps of yet another embodiment of the current method.
Figure 16:
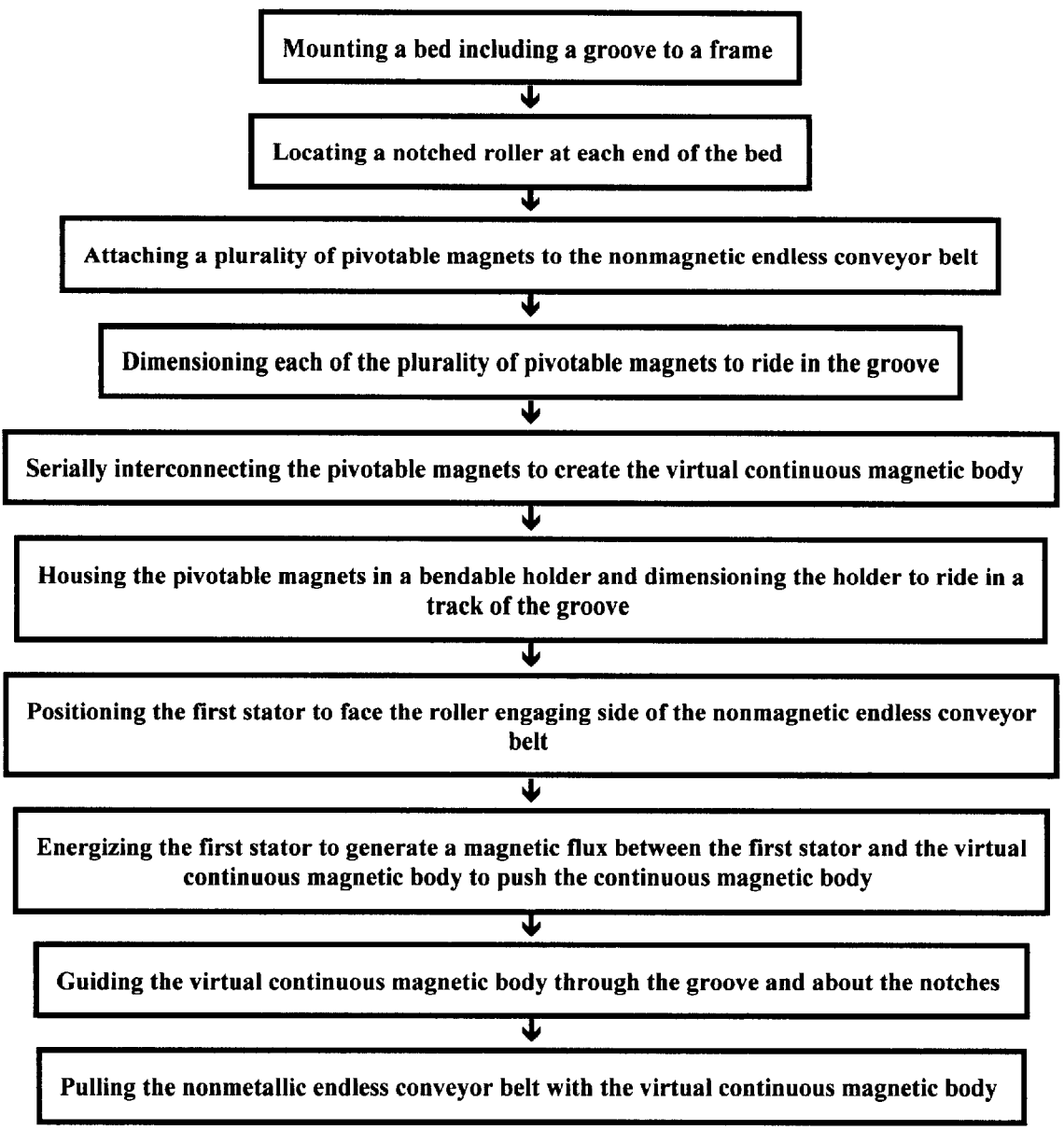
FIG. 16 is a diagrammatic representation of the steps of still another embodiment of the present invention.
Figure 17:
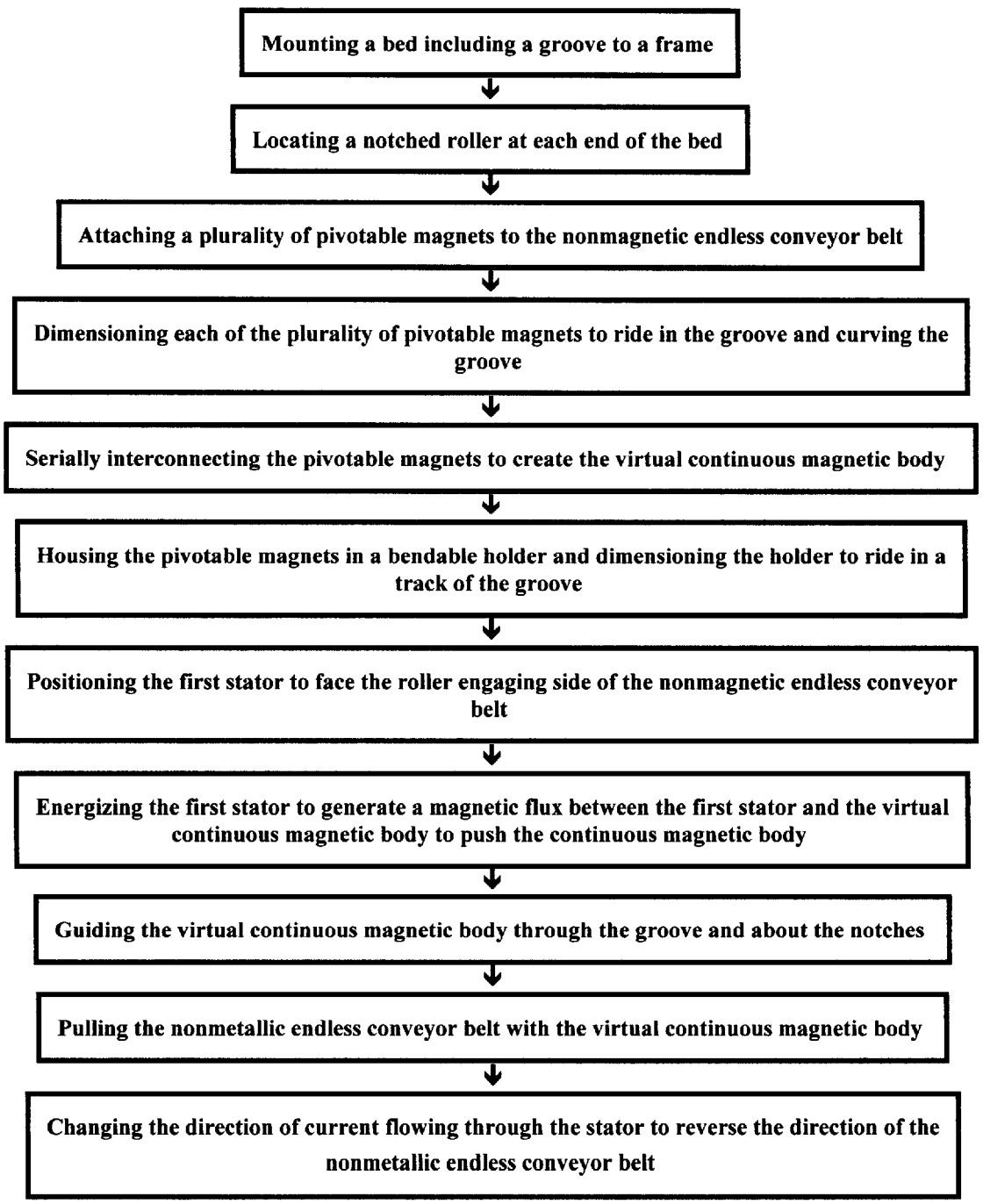
FIG. 17 is an illustration of the steps of yet another embodiment of the present method.
Figure 18:
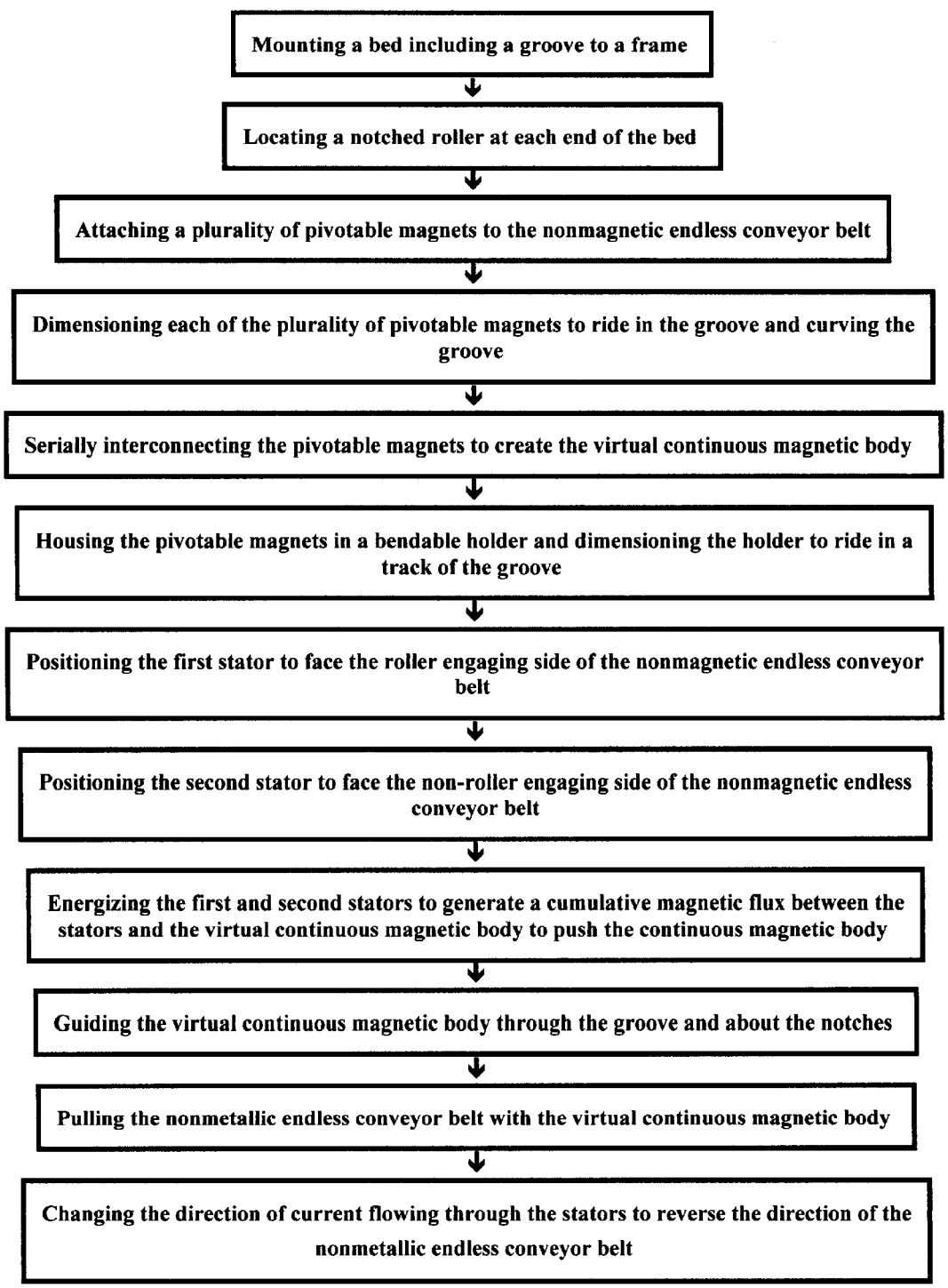
FIG. 18 is an exemplification of the steps of yet another embodiment of the current method.
Figure 19:
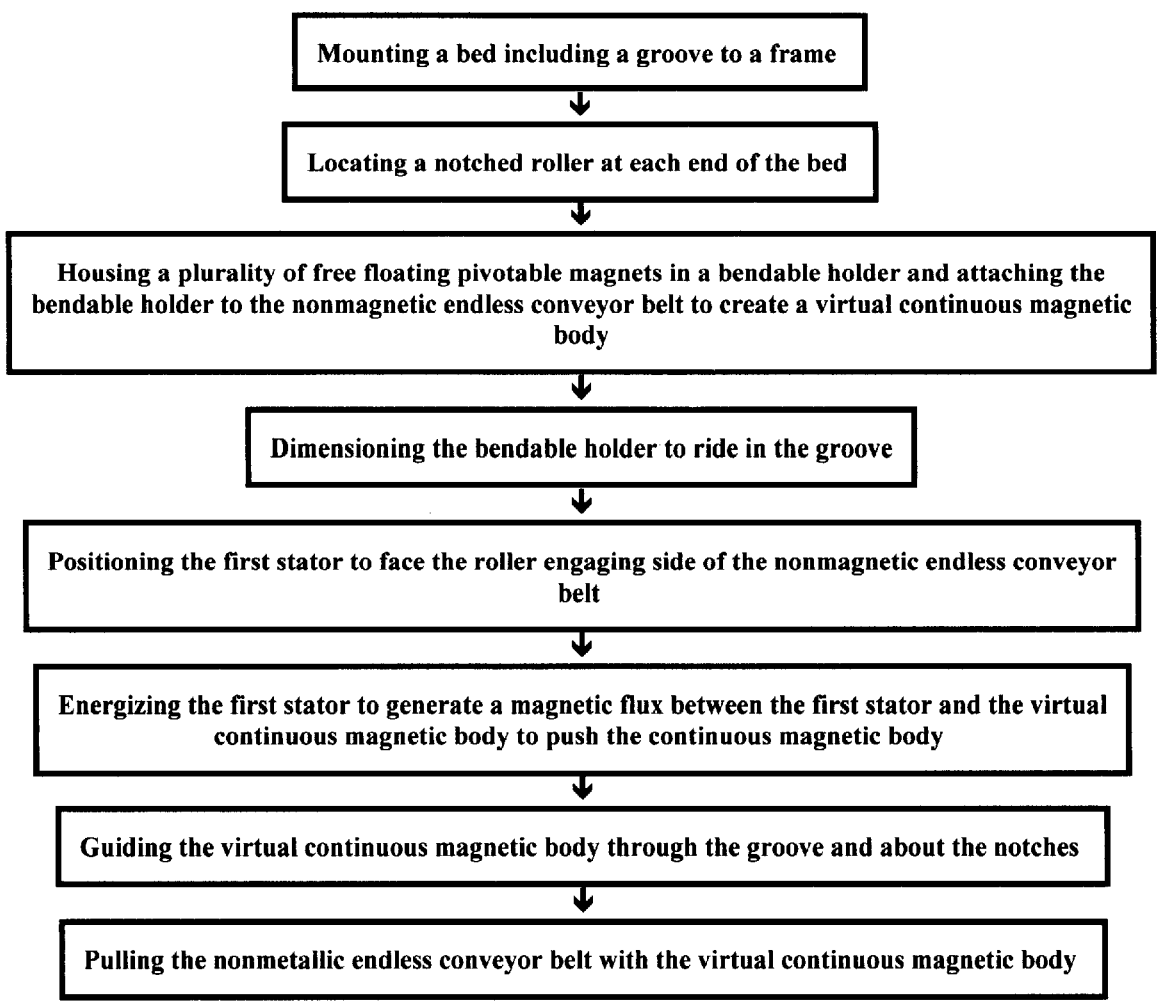
FIG. 19 is a diagrammatic representation of the steps of yet still another embodiment of the present invention.
Figure 20:
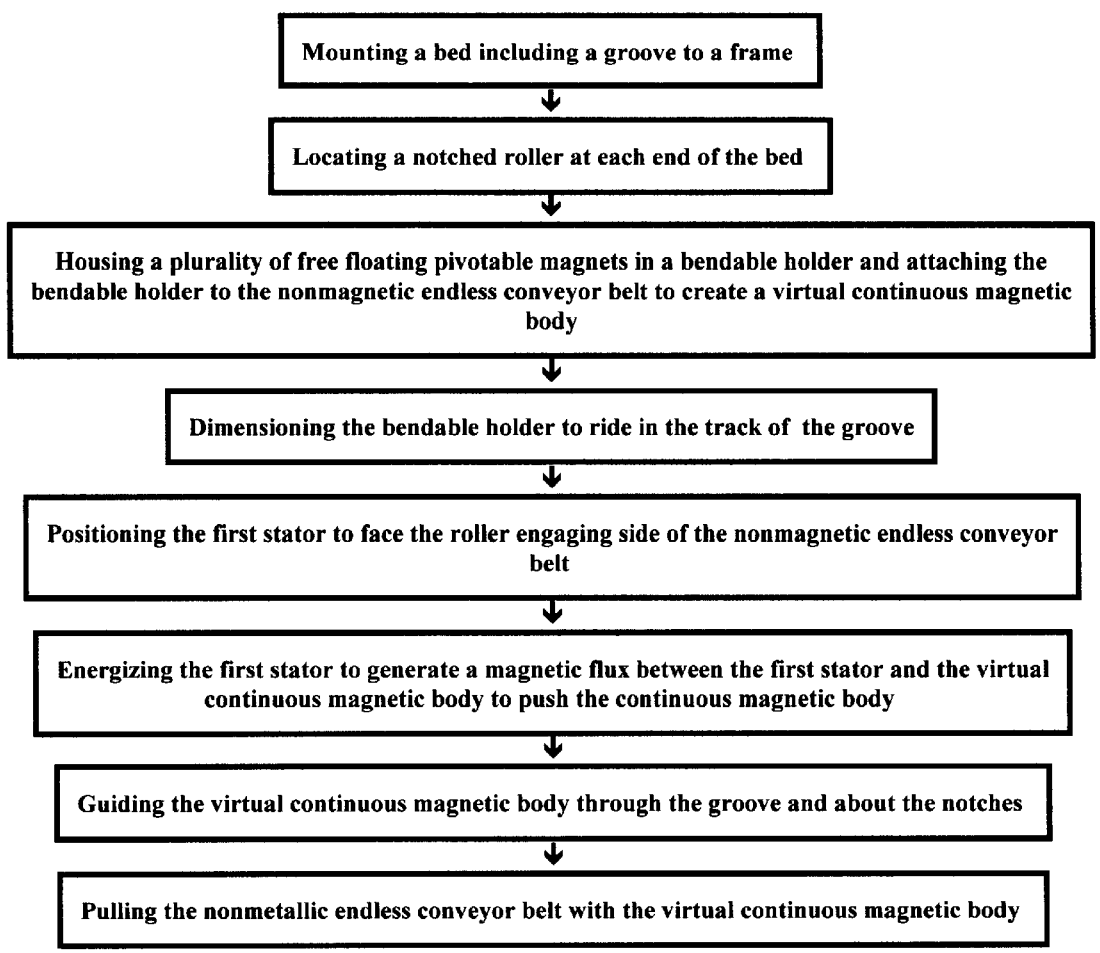
FIG. 20 is an exemplification of the steps of yet another embodiment of the current method.
Figure 21:
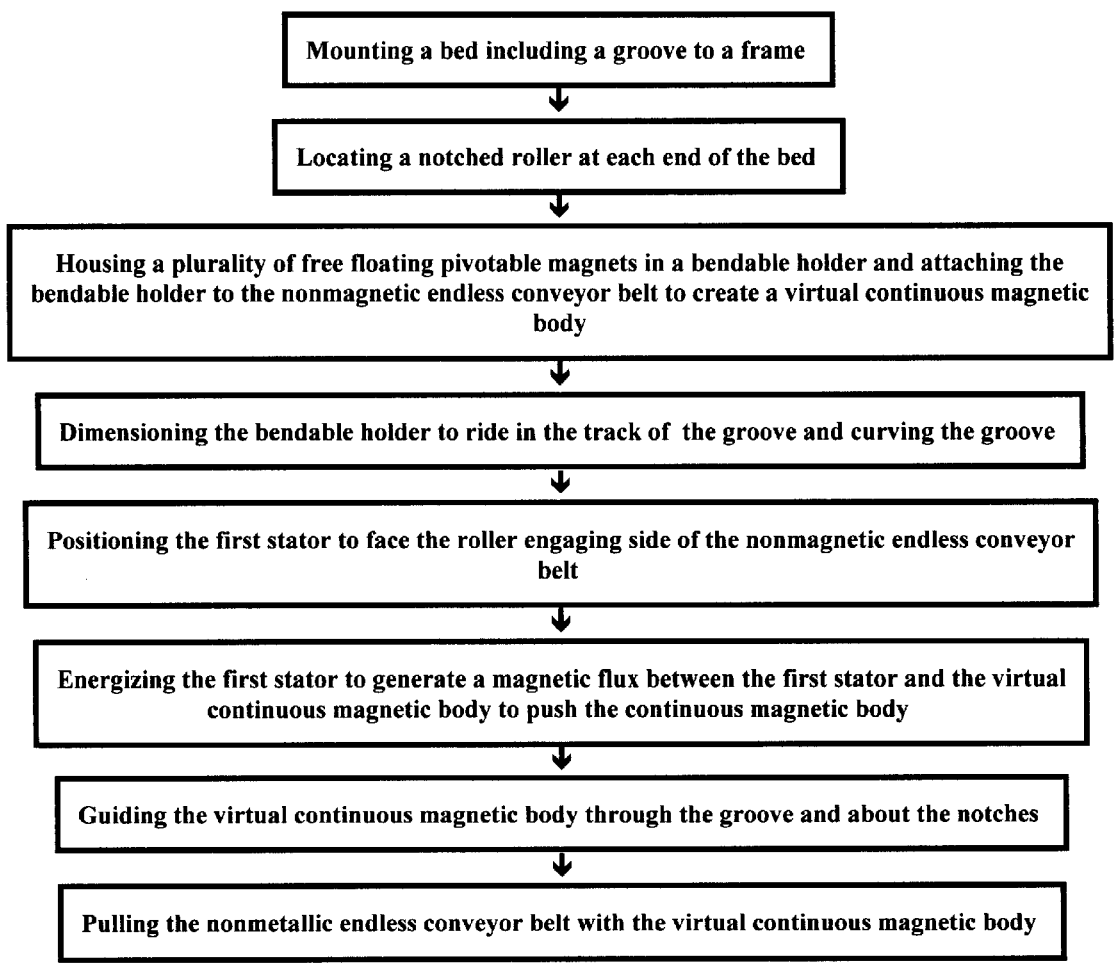
FIG. 21 is a diagrammatic representation of the steps of still another embodiment of the present invention.
Figure 22:
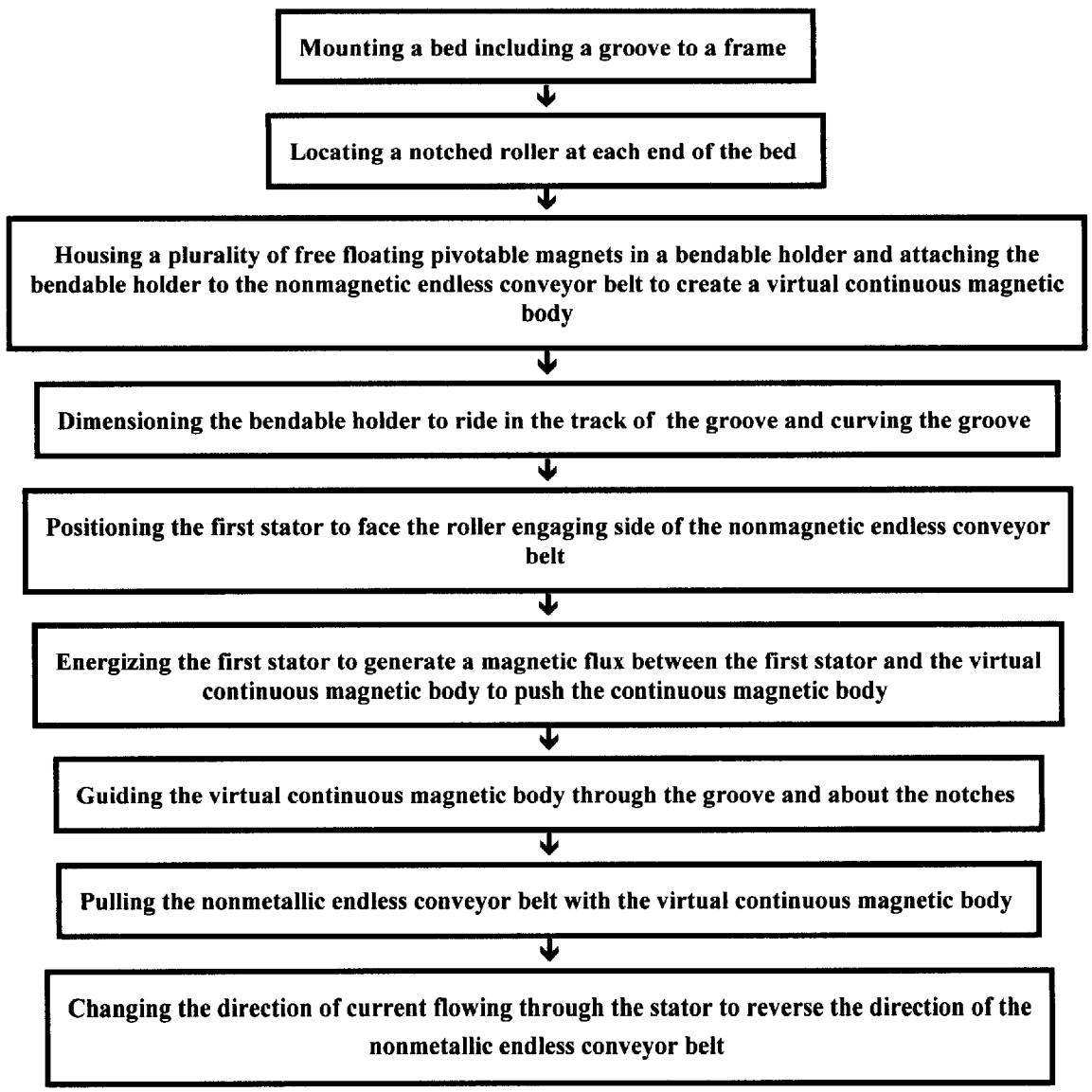
FIG. 22 is an illustration of the steps of yet another embodiment of the present method.
Figure 23:
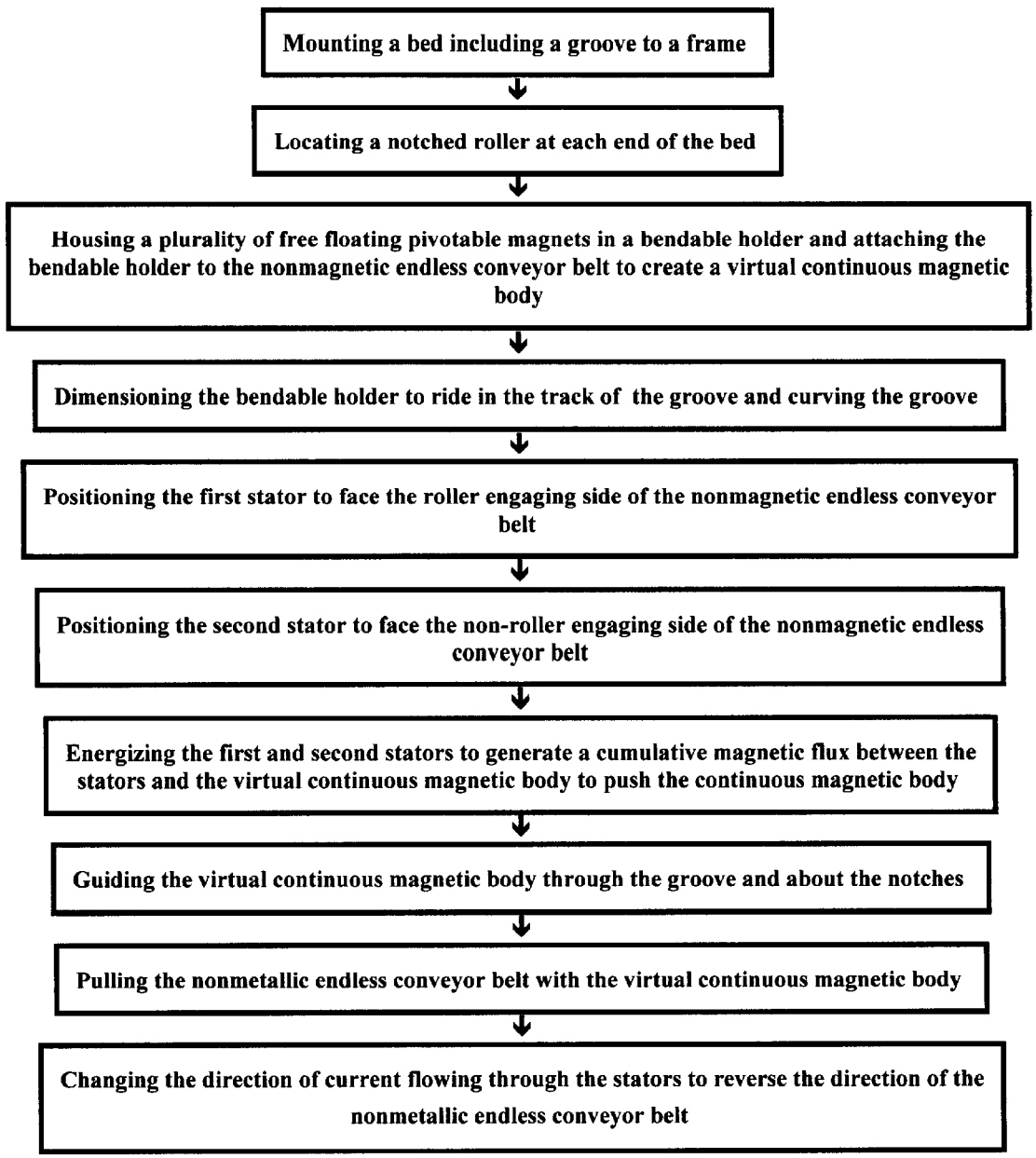
FIG. 23 is an exemplification of the steps of yet another embodiment of the current method.

For either a curved or straight conveyor, within the ambit of the current invention, FIG. 12 is a diagrammatic representation of a suggested arrangement, from superior to inferior elements, for a single stator embodiment, and FIG. 13 is a diagrammatic representation of a suggested disposition, from superior to inferior elements, for an embodiment incorporating two stators. Steps associated with the practice of the present invention and method are set forth in FIGS. 14–23. Those steps are related to practice of using the structures previously set forth, and they include such elements, as pivotable magnets, virtual continuous magnetic bodies, stators, endless nonmagnetic conveyor belts, as well the use of cumulative magnetic flux to push the virtual continuous magnetic body. Other method embodiments include the utilization of bendable holders for the virtual continuous magnetic body dimensioned to ride in the tracks of the groove of the conveyor bed. Having disclosed the invention as required by Title 35 of the United States Code, Applicant now prays respectfully that Letters Patent be granted for his invention in accordance with the scope of the claims appended hereto.

What is claimed is:

1. In combination with electromagnetic energy, a flux dependent plurality of bi-directional traveling magnets, comprising:
    a) a bed in which said traveling magnets move, wherein said bed further includes:
        i) a groove running a length of said bed, wherein said groove further comprises:
            A) a first side having a first track for interlocking said traveling magnets; and
            B) a second side having a second track for interlocking said traveling magnets opposite of and substantially parallel to said first side;
    b) a stator including a face projecting an electromagnetic field toward said plurality of traveling magnets;
    c) a switch for controlling direction of electric current flowing through said stator such that said plurality of traveling magnets move through said groove in response to a current dependent flux generated between said first stator and said plurality of traveling magnets;
    d) a virtual continuous magnetic body rendered by a cooperation of adjacent and overlapping members of said plurality of traveling magnets and said electromagnetic field; and
    e) wherein each of said plurality of traveling magnets further comprises:
        i) a dimension for interlocking said first track and said second track of said groove; and
        ii) a hinge for interconnecting serially an adjacent member of said plurality of traveling magnets.

2. The invention of claim 1 wherein said hinge is pivotable such that any of said plurality of traveling magnets can move through a curve of said groove.

3. The invention of claim 2 further comprising a protectant for said traveling magnets.

4. The invention of claim 3 wherein said plurality of traveling magnets is attached to a carrier for transporting an item.

5. The invention of claim 4 wherein said traveling magnets oscillate between two locations in said bed.

6. An electromagnetic induction driven bi-directional conveyor, comprising:
    a) a frame;
    b) a guide supported by said frame, wherein said guide further comprises:
        i) a bed having a groove running a length of said bed; and wherein said groove further includes:
            A) a first side; and
            B) a second side opposite of and substantially parallel to said first side;
    c) a first roller, having a notch, located near a first distal edge of said bed;
    d) a second roller, having a notch, located near a second distal edge of said bed opposite said first distal edge of said bed;
    e) an endless nonmagnetic belt directed by said guide, wherein said endless nonmagnetic belt further comprises:
        i) a roller engaging side; and
        ii) a non-roller engaging side opposite said roller engaging side;
    f) a first stator including a face projecting a first electromagnetic field toward said roller engaging side of said endless nonmagnetic belt; and
    g) a plurality of pivotable magnets serially interconnected to each other and individually attached to said nonmagnetic belt such that said pivotable magnets traverse, in series, said groove in response to a magnetic flux created between said first stator's face and said pivotable magnets encountering said first electromagnetic field.

7. The invention of claim 6 wherein a majority of said plurality of serially interconnected pivotable magnets is dimensioned to ride in a track in a side of said groove.

8. The invention of claim 7 wherein said plurality of serially interconnected pivotable magnets renders a virtual continuous magnetic body for driving said bi-directional conveyor.

9. The invention of claim 8 further comprising a second stator including a face projecting a second electromagnetic field toward said non-roller engaging side of said endless nonmagnetic belt for generating a cumulative magnetic flux between said first and said second electromagnetic fields on said virtual continuous magnetic body for. driving said bi-directional conveyor.

10. The invention of claim 9 wherein each of said plurality of serially interconnected pivotable magnets is dimensioned to overlap each previous and each subsequent pivotable serially interconnected pivotable magnet.

11. The invention of claim 10 further comprising a protectant for said plurality of serially interconnected pivotable magnets.

12. The invention of claim 11 wherein each of said plurality of serially interconnected pivotable magnets is hinged to each previous and each subsequent serially interconnected pivotable magnet.

13. An electromagnetic induction driven bi-directional conveyor, comprising:
    a) a frame;
    b) a guide supported by said frame, wherein said guide further comprises:
        i) a bed having a groove running a length of said bed; and wherein said groove further includes:
            A) a first side having a first track; and
            B) a second side opposite of and substantially parallel to said first side;
        ii) a first roller, having a notch, located near a first distal edge of said bed; and iii) a second roller, having a notch, located near a second distal edge of said bed opposite said first distal edge of said bed;
c) an endless nonmagnetic belt directed by said guide, wherein said endless nonmagnetic belt further comprises:
    i) a roller engaging side; and
    ii) a non-roller engaging side opposite said roller engaging side;
d) a first stator, including a first face projecting a first electromagnetic field toward said roller engaging side of said endless nonmagnetic belt, mounted to said frame;
e) a second stator, including a second face projecting a second electromagnetic field toward said non-roller engaging side of said endless nonmagnetic belt, mounted to said frame;
f) a plurality of overlapping pivotable serially hinged magnets attached to said nonmagnetic belt such that said overlapping pivotable serially hinged magnets ride in said track of said groove; and
    i) render a virtual continuous magnetic body for driving said bi-directional conveyor; and
    ii) traverse, in series, said groove in response to a cumulative magnetic flux created between said first and said second electromagnetic fields and said virtual continuous magnetic body encountering said first and said second electromagnetic fields; and
    ii) rotate, in series, about said first and said second roller; and
g) a protectant for said virtual continuous magnetic body.

14. The invention of claim 13 wherein said virtual continuous magnetic body moves through a curve of said groove.

15. An electromagnetic induction driven bi-directional conveyor, comprising:
a) a frame;
b) a guide supported by said frame, wherein said guide further comprises:
    i) a bed having a groove running a length of said bed; and wherein said groove further includes:
        A) a first side; and
        B) a second side opposite of and substantially parallel to said first side;
c) a first roller, having a notch, located near a first distal edge of said bed;
d) a second roller, having a notch, located near a second distal edge of said bed opposite said first distal edge of said bed;
e) an endless nonmagnetic belt directed by said guide, wherein said endless nonmagnetic belt further comprises:
    i) a roller engaging side; and
    ii) a non-roller engaging side opposite said roller engaging side;
f) a first stator including a face projecting a first electromagnetic field toward said roller engaging side of said endless nonmagnetic belt; and
g) a holder attached to said endless nonmagnetic belt and containing a plurality of pivotable magnets such that said holder traverses said groove in response to a magnetic flux created between said first stator's face and said pivotable magnets encountering said first electromagnetic field.

16. The invention of claim 15 wherein said holder is dimensioned to ride in a track in a side of said groove.

17. The invention of claim 16 wherein said plurality of pivotable magnets renders a virtual continuous magnetic body for driving said bi-directional conveyor.

18. The invention of claim 17 further comprising a second stator including a face projecting a second electromagnetic field toward said non-roller engaging side of said endless nonmagnetic belt for generating a cumulative magnetic flux between said first electromagnetic field, said second electromagnetic field and said virtual continuous magnetic body for driving said bi-directional conveyor.

19. The invention of claim 18 wherein each of said plurality of pivotable magnets is hinged to each previous and each subsequent pivotable magnet.

20. An electromagnetic induction driven bi-directional conveyor, comprising:
a) a frame;
b) a guide supported by said frame, wherein said guide further comprises:
    i) a bed having a groove running a length of said bed; and wherein said groove further includes:
        A) a first side having a first track; and
        B) a second side opposite of and substantially parallel to said first side;
    ii) a first roller, having a notch, located near a first distal edge of said bed; and
    iii) a second roller, having a notch, located near a second distal edge of said bed opposite said first distal edge of said bed;
c) an endless nonmagnetic belt directed by said guide, wherein said endless nonmagnetic belt further comprises:
    i) a roller engaging side; and
    ii) a non-roller engaging side opposite said roller engaging side;
d) a first stator, including a first face projecting a first electromagnetic field toward said roller engaging side of said endless nonmagnetic belt, mounted to said frame;
e) a second stator, including a second face projecting a second electromagnetic field toward said non-roller engaging side of said endless nonmagnetic belt, mounted to said frame; and
f) a bendable holder attached to said endless nonmagnetic belt for traversing said groove:
    i) wherein said bendable holder further contains a plurality of pivotable magnets such that said bendable holder traverses said groove in response to a cumulative magnetic flux created between said first stator's face, said second stator's face and said pivotable magnets encountering said first electromagnetic field and said second electromagnetic field; and
    ii) wherein said holder is dimensioned to ride in a track in a side of said groove; and
    iii) wherein each of said plurality of pivotable magnets is hinged serially to each previous and each subsequent pivotable magnet.

21. The invention of claim 20 wherein said plurality of pivotable magnets hinged serially renders a virtual continuous magnetic body for driving said bi-directional conveyor.

22. The invention of claim 21 wherein said groove further includes a curve.

23. A method of driving a nonmagnetic endless conveyor belt, comprising the steps of:
a) mounting a bed, including a groove, to a frame for supporting said nonmagnetic endless conveyor belt;

b) locating a notched roller at each end of said bed for altering direction of said nonmagnetic endless conveyor belt;

c) attaching a plurality of pivotable magnets to said nonmagnetic endless conveyor belt;

d) dimensioning each of said plurality of pivotable magnets to ride in said groove;

e) serially interconnecting each of said plurality of pivotable magnets such that a virtual continuous magnetic body is created;

f) positioning a first stator to face a roller engaging side of said nonmagnetic endless conveyor belt;

g) energizing said first stator to generate a magnetic flux between said first stator and said virtual continuous magnetic body encountering said first stator's electromagnetic field;

h) using said magnetic flux created between said first stator's electromagnetic field and said virtual continuous magnetic body to push said continuous magnetic body;

i) guiding said virtual continuous magnetic body through said groove and about said notches; and j) pulling said nonmetallic endless conveyor belt with said virtual continuous magnetic body.

24. The method of claim 23 further comprising the step of housing said plurality of pivotable magnets in a bendable holder.

25. The method of claim 24 further comprising the step of dimensioning said holder to ride in a track of said groove.

26. The method of claim 25 further comprising the step of curving said groove.

27. The method of claim 26 further comprising the step of reversing the direction of said nonmetallic endless conveyor belt by changing direction of electric current flowing through said first stator.

28. The method of claim 27 further comprising the step of positioning a second stator to face a non-roller engaging side of said nonmagnetic endless conveyor belt.

29. A method of driving a nonmagnetic endless conveyor belt, comprising the steps of:

a) mounting a bed, including a groove, to a frame for supporting said nonmagnetic endless conveyor belt;

b) locating a notched roller at each end of said bed for altering direction of said nonmagnetic endless conveyor belt;

c) containing a plurality of free floating pivotable magnets inside a bendable holder such that a virtual continuous magnetic body is created;

d) dimensioning said bendable holder to ride in said groove;

e) positioning a first stator to face a roller engaging side of said nonmagnetic endless conveyor belt;

f) energizing said first stator to generate a magnetic flux between said first stator and said virtual continuous magnetic body encountering said first stator's electromagnetic field;

g) using said magnetic flux created between said first stator's electromagnetic field and said virtual continuous magnetic body to push said continuous magnetic body;

h) guiding said virtual continuous magnetic body through said groove and about said notches; and i) pulling said nonmetallic endless conveyor belt with said virtual continuous magnetic body.

30. The method of claim 29 further comprising the step of dimensioning said holder to ride in a track of said groove.

31. The method of claim 30 further comprising the step of curving said groove.

32. The method of claim 31 further comprising the step of reversing the direction of said nonmetallic endless conveyor belt by changing direction of electric current flowing through said first stator.

33. The method of claim 32 further comprising the step of positioning a second stator to face a non-roller engaging side of said nonmagnetic endless conveyor belt.

\* \* \* \* \*